(12) United States Patent
Dhayal et al.

(10) Patent No.: US 11,246,320 B2
(45) Date of Patent: Feb. 15, 2022

(54) CASEIN GLYCOMACROPEPTIDE (CGMP) OLIGOMERS

(71) Applicant: Chr. Hansen A/S, Hoersholm (DK)

(72) Inventors: Surender Kumar Dhayal, Rungsted Kyst (DK); Martin Lund, Copenhagen Ø (DK); Johannes Maarten Van Den Brink, Herlev (DK)

(73) Assignee: CHR. HANSEN A/S, Hoersholm (DK)

(*) Notice: Subject to any disclaimer, the term of this patent is extended or adjusted under 35 U.S.C. 154(b) by 64 days.

(21) Appl. No.: 16/479,144

(22) PCT Filed: Jan. 8, 2018

(86) PCT No.: PCT/EP2018/050317
§ 371 (c)(1),
(2) Date: Jul. 18, 2019

(87) PCT Pub. No.: WO2018/134066
PCT Pub. Date: Jul. 26, 2018

(65) Prior Publication Data
US 2019/0350217 A1  Nov. 21, 2019

(30) Foreign Application Priority Data
Jan. 19, 2017 (EP) .................................. 17152217

(51) Int. Cl.
*A23C 21/02* (2006.01)
*A23L 33/18* (2016.01)
*A23L 33/19* (2016.01)

(52) U.S. Cl.
CPC .............. *A23C 21/02* (2013.01); *A23L 33/18* (2016.08); *A23L 33/19* (2016.08)

(58) Field of Classification Search
CPC .......... A23C 21/02; A23L 33/18; A23L 33/19
USPC ........................................................ 426/41
See application file for complete search history.

(56) References Cited

U.S. PATENT DOCUMENTS

2009/0253165 A1  10/2009 Dardelle et al.
2014/0220178 A1* 8/2014 Aaltonen ....... C12Y 203/02013
426/10

FOREIGN PATENT DOCUMENTS

| EP | 0 856 355 B1 | 8/1998 |
| EP | 1 062 876 A1 | 12/2000 |
| JP | 3225081 B2 * | 11/2001 |
| WO | WO-2008/017499 A1 | 2/2008 |

OTHER PUBLICATIONS

Tolkach et al., Fractionation of whey proteins and caseinomacropeptide by means of enzymatic crosslinking and membrane separation techniques, Journal of Food Engineering. (Year: 2005).*
Translation of JP-3225081-B2 (Year: 2001).*
El-Salam, "Separation of Casein Glycomacropeptide from Whey: Methods of Potential Industrial Application," International Journal of Dairy Sciences 1 (1): 93-99, 2006.

(Continued)

*Primary Examiner* — Brent T O'Hern
(74) *Attorney, Agent, or Firm* — Foley & Lardner LLP

(57) ABSTRACT

A method for making a new food, feed or pharmaceutical product comprising addition of a composition comprising cross-linked, via intermolecular covalent isopeptide bonds, casein glycomacropeptide (CGMP) oligomers (CGMP oligomers) to the product.

16 Claims, 28 Drawing Sheets

(56) References Cited

OTHER PUBLICATIONS

Livney, "Milk proteins as vehicles for bioactives," Current Opinion in Colloid & Interface Science 15 (2010) 73-83 (Avail. Online Nov. 2009).

Luo et al., "Filtration behavior of casein glycomacropeptide (CGMP) in an enzymatic membrane reactor: fouling control by membrane selection and threshold flux operation," Journal of Membrane Science 469 (2014) 127-139 (Avail Online Jun. 2014).

Tolkach et al., "Fractionation of whey proteins and caseinomacropeptide by means of enzymatic crosslinking and membrane separation techniques," Journal of Food Engineering 67 (2005) 13-20.

* cited by examiner

| | | | | | |
|---|---|---|---|---|---|
| C | 0.047770701 | mg/L | C | 2.595541401 | mg/L |
| C | 4.06149E-07 | mM | C | 2.20674E-05 | mM |
| v_max | 7.85889E-05 | mM/s | v_max | 2.30243E-05 | mM/s |
| Km | 0.001460134 | M | Km | 0.002435455 | M |
| k_cat | 193 | 1/s | k_cat | 1 | 1/s |
| k_cat/Km | 132521 | M-1 s-1 | k_cat/Km | 428 | M-1 s-1 |

Figure 15

CASEIN GLYCOMACROPEPTIDE (CGMP) OLIGOMERS

CROSS-REFERENCE TO RELATED APPLICATIONS

The present application is the U.S. National Stage of International Application No. PCT/EP2018/050317, filed Jan. 8, 2018, and claims priority to European Patent Application No. 17152217.0, filed Jan. 19, 2017.

FIELD OF THE INVENTION

The present invention relates to a method for making a new food, feed or pharmaceutical product comprising addition of a composition comprising cross-linked, via intermolecular covalent isopeptide bonds, casein glycomacropeptide (CGMP) oligomers (CGMP oligomers) to the product.

BACKGROUND ART

Milk proteins are natural vehicles, which evolved to deliver essential micronutrients (e.g. calcium and phosphate) and building blocks (e.g. amino acids), as well as immune system components (e.g. immunoglobulins, and lactoferrin), from mother to the newborn.

Accordingly, milk proteins may be seen as natural vehicles for bioactives. Many of their structural and physicochemical properties facilitate their functionality in delivery systems. These properties include binding of ions and small molecules, excellent surface and self-assembly properties; superb gelation properties; pH-responsive gel swelling behavior, useful for programmable release; interactions with other macromolecules to form complexes and conjugates with synergistic combinations of properties; various shielding capabilities, essential for protecting sensitive payload; biocompatibility and biodegradability, enabling to control the bioaccessibility of the bioactive, and promote its bioavailability.

Figure 1:
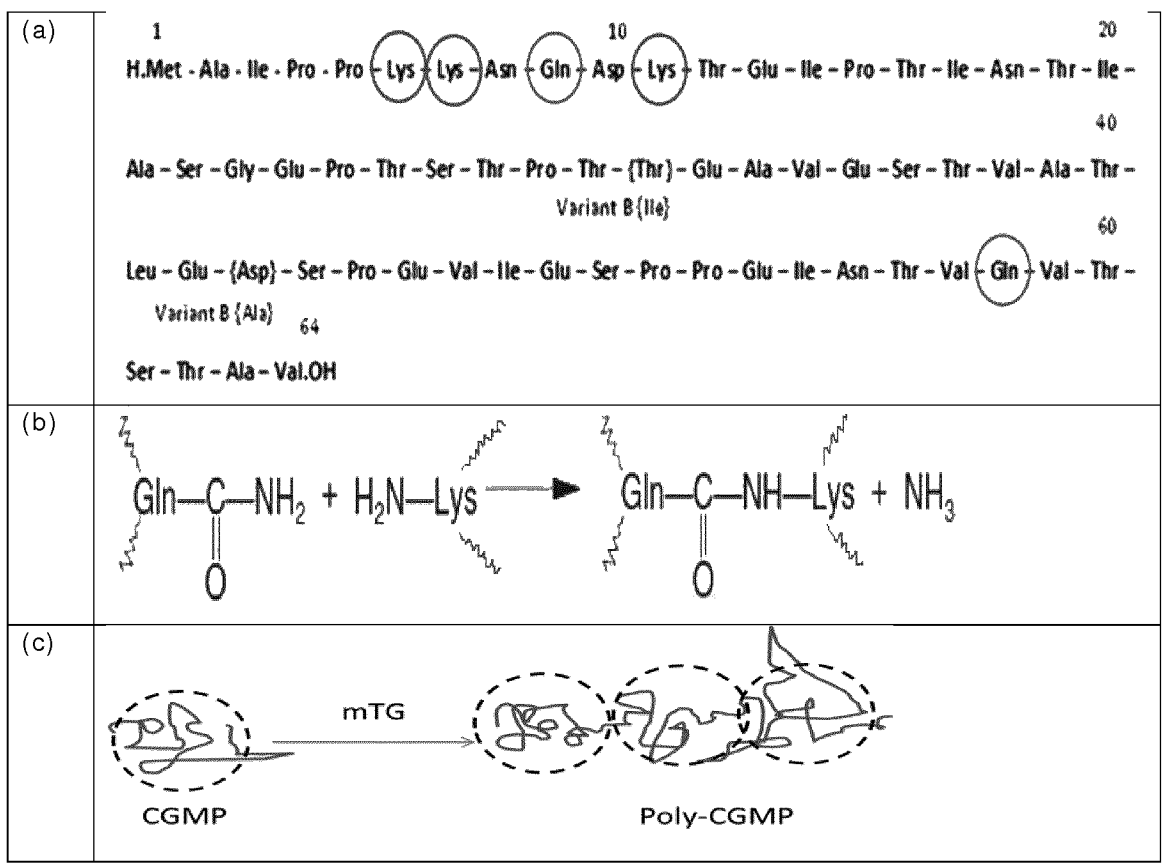

An illustration of several functionalities of milk proteins is given in FIG. 1 of the review article of Yoav D. Livney (Current Opinion in Colloid & Interface Science 15 (2010) 73-83)—this FIG. 1 of the Yoav D. Livney article is shown herein as FIG. 21.

As discussed in the review article of M. H. Abd El-Salam, 2006 (Separation of Casein Glycomacropeptide from Whey: Methods of Potential Industrial Application. International Journal of Dairy Science, 1: 93-99.)—Casein glycomacropeptide (GMP or CGMP—herein "CGMP") is a casein derived peptide found in whey. When milk is coagulated with chymosin during cheese making, the κ-casein is hydrolyzed into two peptides. The larger peptide containing amino acid residues 1-105 is called para-κ-casein which is insoluble and becomes part of the cheese curd. The smaller peptide containing the amino acid residues 106-169 of κ-casein is soluble and becomes part of the whey proteins. Accordingly, CGMP relates to the peptide containing the amino acid residues 106-169 of κ-casein. As known in the art, CGMP may exit in different so-called variants (see e.g. FIG. 1 herein). In the prior art CGMP is sometimes termed caseinomacropeptide (CMP).

CGMP is a heterogeneous fraction containing peptides having the same peptide chain but with variable carbohydrate and phosphorus contents. The functionality and biological activity of this fraction has been attributed to its carbohydrate moiety.

Interest in CGMP has increased recently as a result of the discovered biological activity and its potential uses e.g. in relation to food products.

CGMP is present in significant quantities in whey from cheeses made by rennet coagulation. It is estimated that CGMP occurs in rennet/cheese whey at about 1.2-1.5 g L-1 which constitutes between 15-25% of proteins in this whey. Recovery of CGMP from whey is receiving much attention as an ingredient for special uses and as a mean to modify the functional properties of whey protein concentrates and isolates.

Different methods have been developed for the preparation of CGMP which uses casein or cheese whey as a source for this fraction. However, the worldwide availability of whey makes it the preferred starting material for this purpose.

As discussed in the M. H. Abd El-Salam, 2006 review article—different methods have been developed for large scale separation of CGMP from whey—such methods include methods based on heat precipitation of other whey proteins, methods based on membrane filtration and methods based on combined ultrafiltration and ion exchange chromatography.

CGMP is a monomer and it has an average molecular weight of around 7.5 kDa. The molar mass of monomeric CGMP may vary between 6.7-11 kDa depending on the ratio of non-glycosylated and glycosylated CGMP (i.e. the carbohydrate contents).

Due to aggregation of different monomeric CGMP its actual size may be from 23 to 28 kDa (Jianquan Luo et al. Journal of Membrane Science 469 (2014) 127-139).

As known in the art—aggregation of different monomeric CGMP as discussed in e.g. the above discussed Jianquan Luo et al. article is not based on cross-linking via intermolecular covalent isopeptide bonds.

An example of a commercial available product comprising monomeric CGMP is the Lacprodan® CGMP-10 product of Arla Foods Ingredients, Denmark. The CGMP content of protein of this product is around 75% and 85% protein concentrate dry matter. Transglutaminase (TGase) (code E.C. 2.3.2.13) is an enzyme that forms inter- and intramolecular crosslinks in different proteins.

TGase has been used to obtain a desired milk dotting/gelation for productions of e.g. cheese. For instance, WO2008/017499A1 describes a method to improve the protein content (yield) of the curd comprising simultaneous addition of TGase and rennet/chymosin to whole milk (see e.g. Example 1 of WO2008/017499A1). It is evident that the produced curd comprises a significant amount of para-κ-casein.

The article of A. Tolkach et al. (Journal of Food Engineering 67 (2005) 13-20)) describes a method to obtain a CMP-free whey protein concentrate (see Abstract).

The purpose of the article is to remove CGMP from a whey protein concentrate in order to obtain purer fractions of the whey proteins P-Lactoglobulin (β-lg) and α-Lactalbumin (α-la)—for instance reads the article on page 15, right column, mid: "It is the purpose of this study to demonstrate a new way of separating whey proteins from CMP in rennet whey by means of Tgase in order to allow purer fractions of β-lg and α-la to be obtained further downstream."

A step in the A. Tolkach article β-lg/α-la described purification method is addition of Transglutaminase (TGase) to a whey protein concentrate (WPC), which is shown to give cross-linked CGMP (i.e. formation of CGMP oligomers). The cross-linked CGMP (i.e. CGMP oligomers) are then removed in order to get the purer fractions of β-lg/α-la whey proteins.

CGMP monomer has three Lys and two Gln residues in its primary sequence and these are the target substrates for TGase. As discussed in the A. Tolkach article, TGase induced cross-linking of Lys and Gln leads to the formation of oligomeric CGMP via intermolecular covalent isopeptide bonds—see FIG. 1 herein for an illustration of a possible TGase based cross-linking of CGMP mechanism.

As discussed above, the purpose of the A. Tolkach article is to remove CGMP and it does not describe any herein commercially relevant use (e.g. for making a food product) of the obtained cross-linked CGMP (i.e. CGMP oligomers) fractions, since it is understood that these cross-linked CGMP fraction/compositions are essentially removed from the fractions containing β-lg/α-la (i.e. to get the purer fractions of β-lg and α-la).

SUMMARY OF THE INVENTION

The problem to be solved by the present invention is to provide a novel milk protein derived composition with improved functionalities in relation to making new e.g. food, feed and/or pharmaceutical products.

The solution is based on that the present inventors identified that covalently crosslinked CGMP (herein termed CGMP oligomers or oligo-CGMP) was found to have many new/novel improved functional properties that were not shown by the monomeric CGMP.

As discussed herein, the CGMP oligomers may e.g. be made by use of TGase based on e.g. whey, whey protein concentrate (WPC), whey protein isolate (WPI) or more purified monomeric CGMP (e.g. Lacprodan® CGMP-10 product) as starting "monomeric CGMP" material (see e.g. FIG. 1 and working examples herein).

In working examples herein was used microbial Transglutaminase—it may herein be referred to as mTG.

As discussed above, casein glycomacropeptide (GMP, CMP or CGMP—herein "CGMP") is a casein derived peptide found in whey. When milk is coagulated with chymosin during cheese making, the κ-fraction is hydrolyzed into two peptides. The larger peptide containing amino acid residues 1-105 is called para-κ-casein which is insoluble and becomes part of the cheese curd. The smaller peptide containing the amino acid residues 106-169 of κ-casein is soluble and becomes part of the whey proteins.

Accordingly, monomeric CGMP relates to the peptide containing the amino acid residues 106-169 of κ-casein. As known in the art, monomeric CGMP may exist in different so-called variants (see e.g. FIG. 1 herein).

Accordingly, the terms CGMP oligomers or oligo-CGMP relates herein to covalently cross-linked CGMP, wherein the monomers are monomeric CGMP.

The working examples herein describe in details examples of herein relevant improved functional properties of CGMP oligomers—for example:

Example 2

Describes self-assembly (association/aggregation) of oligo-CGMP into 'casein-like' micelles (association colloids) and their use to encapsulate phytochemicals such as curcumin and β-carotene—monomeric CGMP did not properly show this property of self-assembly and thereby usefulness to encapsulate phytochemicals such as curcumin and β-carotene;

Example 3

Describes use of the oligo-CGMP for making stable acidic CGMP based clear beverages which is not possible with the monomeric form, since the stability of monomeric CGMP in acidic beverages is not very good and it aggregates at low pH which leads to turbidity build-up in these beverages—accordingly, use of oligo-CGMP gives the possibility to make a clear acidic protein rich based beverages based entirely on ingredients derived from milk;

Example 4

Describes colloidal stabilization of calcium-salt based precipitated particles with oligo-CGMP and its use for calcium fortification. As described in the example, oligo-CGMP slow down the precipitation of calcium phosphate (CaP) particles much more effectively as compared to its monomeric form;

Example 5

Describes colloidal stabilization of calcium-salt based precipitated particles with oligo-CGMP and its use for encapsulation (e.g. controlled delivery and release of dairy enzymes into cheese matrix) and use of oligo-CGMP for Pickering stabilization of emulsions. For instance, the enzyme lactase was found to be effectively encapsulated and most of the enzyme activity was retained in the curd (i.e. no significant amount of enzyme in the whey).

Example 6

Describes immobilization of a basic protein/enzyme with oligo-CGMP based on what may be termed an electrostatic complex formation based mechanism. The example demonstrates that the immobilization leads to larger activity yields and hence can e.g. be used for immobilizing relatively large amounts of enzymes (e.g. lactose oxidase (LOX, LactoYIELD®, Chr. Hansen A/S)).

Example 7

Describes use of oligo-CGMP for gelation. As described—the gelation properties of oligo-CGMP (poly-CGMP) can e.g. be used for delivering textural and encapsulation functionalities in the food (dairy) products as well as in other bio-related applications.

Example 8

Describes self-assembly via so-called hierarchical-assembly of oligo-CGMP. The hierarchical-assembly described in this example along with that described in examples 2-7 can be combined in various (complex) ways to have varying amounts of organic (e.g. poly-CGMP) and inorganic (e.g. CaP/CaC) phases leading to diverse applications such as colloidal stabilization, texturing and encapsulation. Accordingly, this example illustrates that oligo-CGMP self-assembled structures/aggregates can be used for e.g. colloidal stabilization, texturing and/or encapsulation.

Based on the herein described detailed numerous surprising advantageous properties of CGMP oligomers—there is no reason to believe that the CGMP oligomers should not be advantageous in relation to numerous herein commercial relevant uses.

Figure 21:
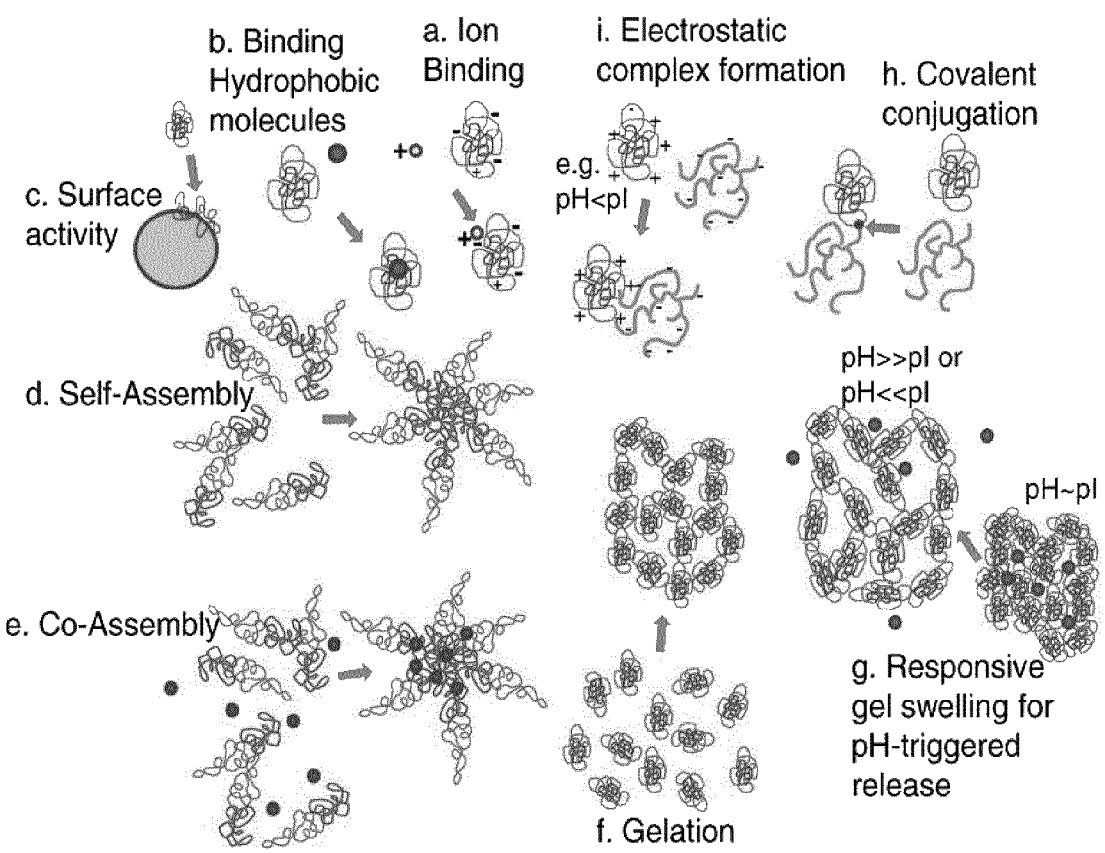

As discussed above, an illustration of several functionalities of milk proteins is given in FIG. 1 of the review article of Yoav D. Livney (Current Opinion in Colloid & Interface Science 15 (2010) 73-83)—this FIG. 1 of the Yoav D. Livney article is shown herein as FIG. 21 and it is believed that the herein discussed CGMP oligomers may be useful in all of the several functionalities as shown in FIG. 21.

Accordingly, a first aspect of the invention relates to a method for making a new food, feed or pharmaceutical product comprising following step:

(i): addition of a composition comprising cross-linked, via intermolecular covalent isopeptide bonds, casein glycomacropeptide (CGMP) oligomers (CGMP oligomers) to a food, feed or pharmaceutical product in order to thereby make the new food, feed or pharmaceutical product and wherein:

(a): the product comprises after addition of the composition at least 1 mg of CGMP oligomers per kg of the product;

and wherein monomeric CGMP is the peptide containing the amino acid residues 106-169 of κ-casein and monomers of CGMP oligomers are monomeric CGMP.

Item (a) of the first aspect relates to that a commercially relevant significant amount of CGMP oligomers shall be added to the product. It is required that the added amount of CGMP oligomers in step (i) is an amount that is sufficiently high to give a product (e.g. a yogurt) that comprises at least 1 mg of CGMP oligomers per kg of the product—e.g. if the product is a yogurt then the yogurt must comprise at least 1 mg of CGMP oligomers per kg of the yogurt.

As discussed herein, the CGMP oligomers may be made by use of TGase based on e.g. whey, whey protein concentrate or more purified monomeric CGMP (e.g. Lacprodan® CGMP-10 product) as starting "monomeric CGMP" material (see e.g. FIG. 1 and working examples herein).

According to the art, the term "isopeptide bond" relates to an amide bond that is not present on the main chain of a protein. The bond forms between the carboxyl terminus of one protein (e.g. Glutamine residue) and the amino group of a lysine residue on another (target) protein.

As illustrated in FIG. 1 herein—herein relevant CGMP oligomers comprise isopeptide bond(s).

As discussed above, the purpose of the A. Tolkach article is to remove CGMP and it does not describe any herein commercially relevant use (e.g. for making a food product) of the obtained cross-linked CGMP (i.e. CGMP oligomers) fractions, since it is understood that these cross-linked CGMP fraction/compositions are essentially removed from the fractions containing β-lg/α-la (i.e. to get the purer fractions of β-lg and α-la). Accordingly, the A. Tolkach article does not directly and unambiguously describe a method of the first aspect, wherein there is performed the step (i) of addition of a composition comprising CGMP oligomers to a food, feed or pharmaceutical product in order to thereby make the new food, feed or pharmaceutical product.

As discussed above, TGase has been used to obtain a desired milk clotting/gelation for productions of e.g. cheese. For instance, WO2008/017499A1 describes a method to improve the protein content (yield) of the curd comprising simultaneous addition of TGase and rennet/chymosin to whole milk (see e.g. Example 1 of WO2008/017499A1). Prior art essentially relating to addition of TGase to whole milk (like WO2008/017499A1) does not directly and unambiguously describe a method of the first aspect, since there is not performed step (i) of addition of a composition comprising CGMP oligomers to a food, feed or pharmaceutical product in order to thereby make the new food, feed or pharmaceutical product.

The addition of the composition comprising CGMP oligomers of step (i) of the method of the first aspect will make a structural novel food, feed or pharmaceutical product such, since the added CGMP oligomers will be a structural novel part of the product as such.

Accordingly, a second aspect of the invention relates to a food, a feed or a pharmaceutical product obtainable by the method of the first aspect and/or herein relevant embodiment thereof.

The term "obtainable" of the second aspect may preferably be "obtained".

Embodiment of the present invention is described below, by way of examples only.

As understood by the skilled person in the present context, a combination of a preferred embodiment with another preferred embodiment may be seen as an even more preferred embodiment.

For instance, below is discussed several separate aspects of the invention that e.g. relate to a composition comprising CGMP oligomers as such—it is understood that such separate aspects relating to a composition comprising CGMP oligomers as such may represent preferred embodiments for a preferred composition comprising CGMP oligomers as such in relation to the method of the first aspect.

DRAWINGS

FIG. 1: (a) Primary sequence of CGMP (b, c) Schematic diagram of polymerization of CGMP after the formation of a covalent cross-link between Lys and Gln in presence of microbial transglutaminase (mTG).

Figure 2:
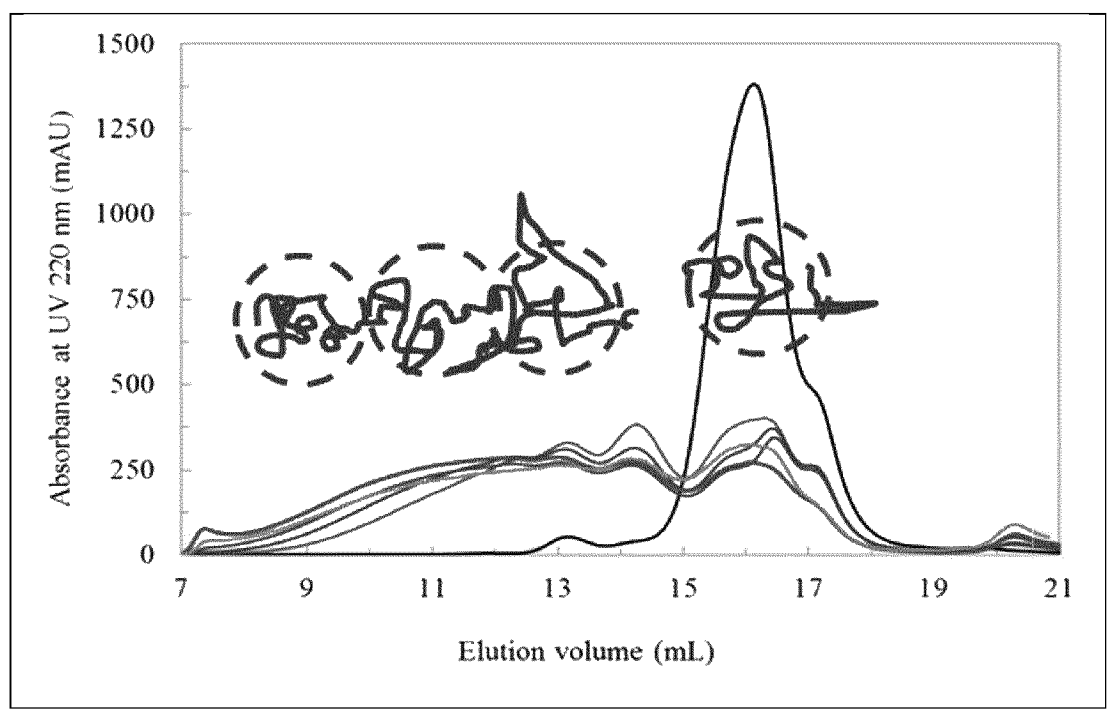

FIG. 2: (a) Size exclusion chromatogram depicting the formation of larger molar mass polymers (that elute between 7-8 mL) and oligomers (8-15 mL) elute much before the monomers (15-17 mL).

Figure 3:
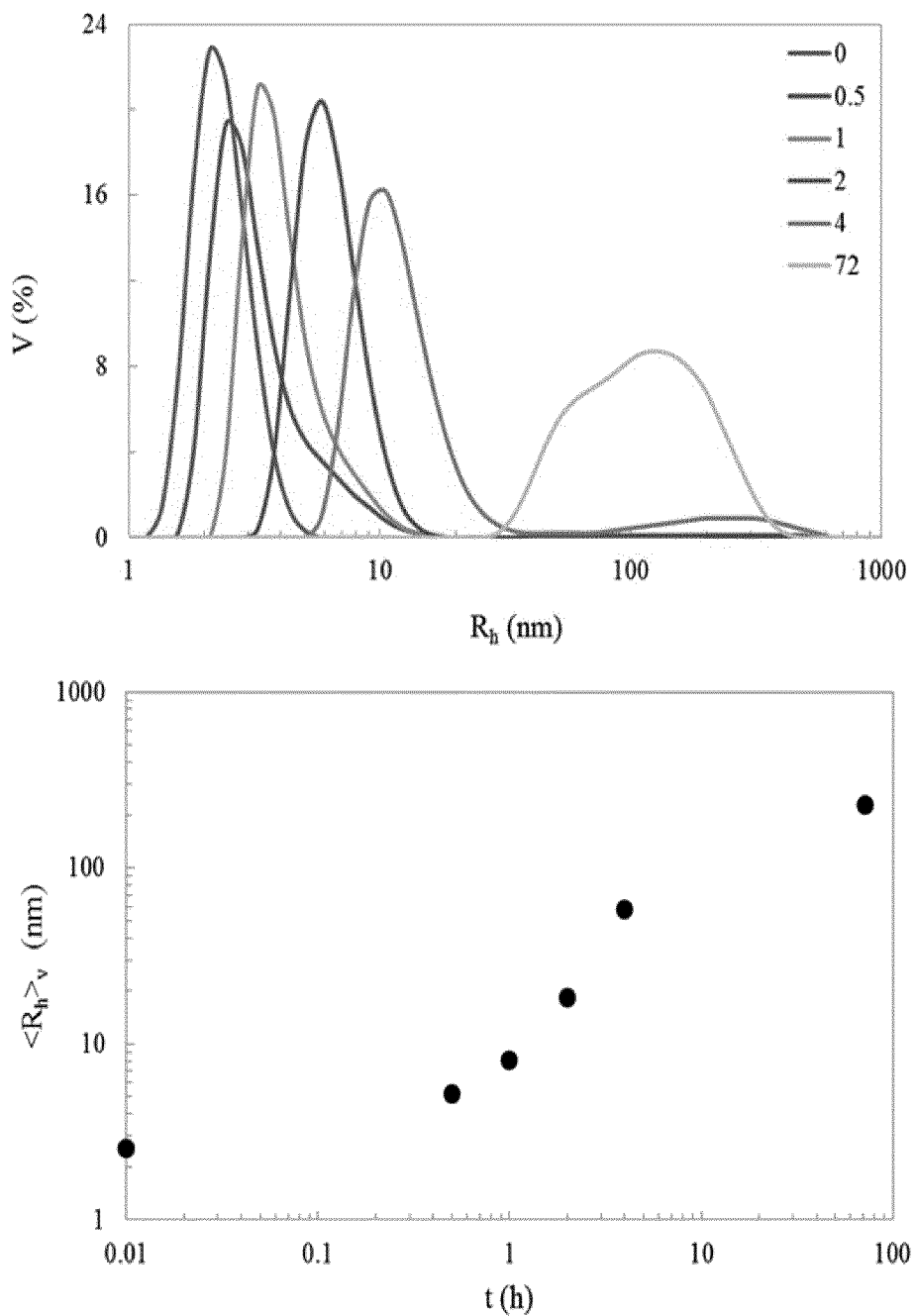

FIG. 3: Volume based distribution of the hydrodynamic radius, Rh measured during the course of the cross-linking reaction (samples collected between time points 0-72 hours).

Figure 4:
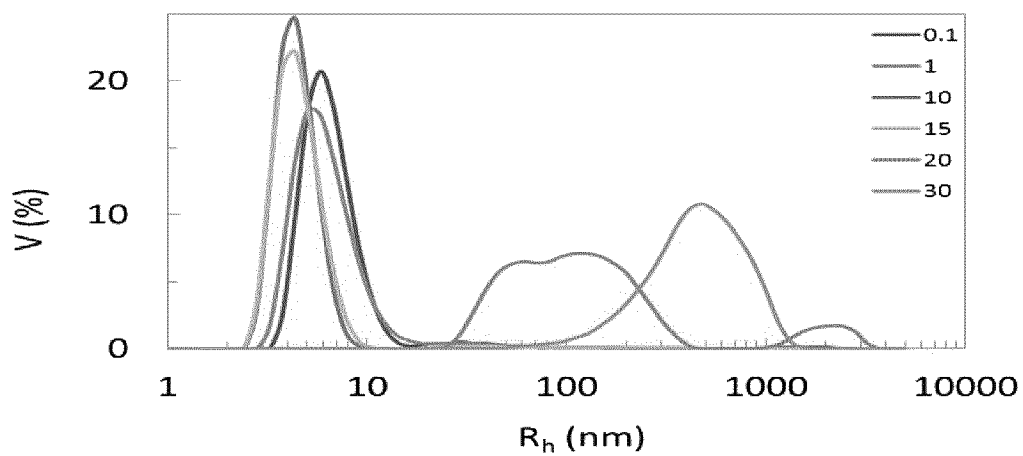

FIG. 4: Self-assembling properties of oligo-CGMP as measured by DLS: (a) Volume based distribution of the hydrodynamic radius, $R_h$ measured for the sample collected after 72 hours of reaction and then diluted to various concentrations between 0.1-30 g $L^{-1}$. (b) The variation of Rh for the oligomers and monomers for varying bulk concentrations.

Figure 5:
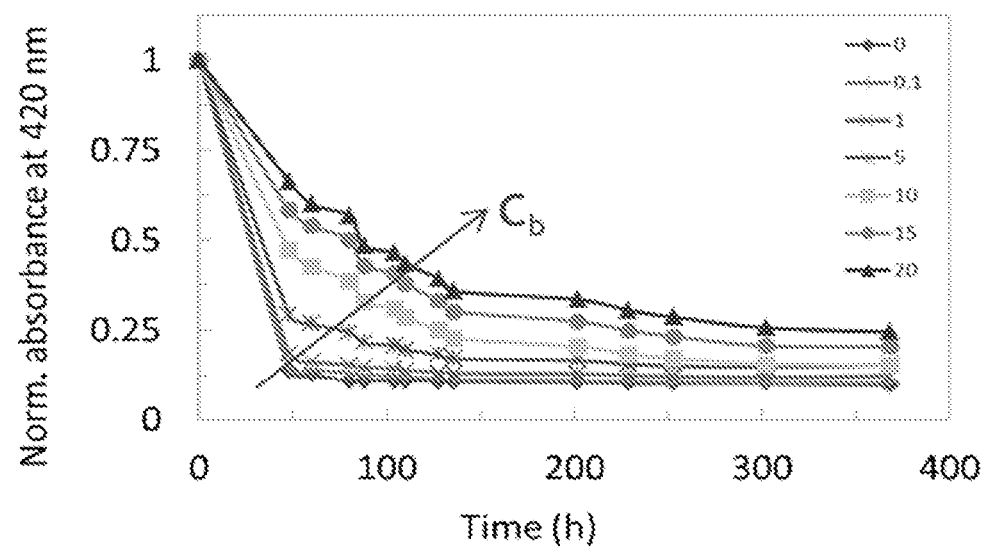
Figure 5:
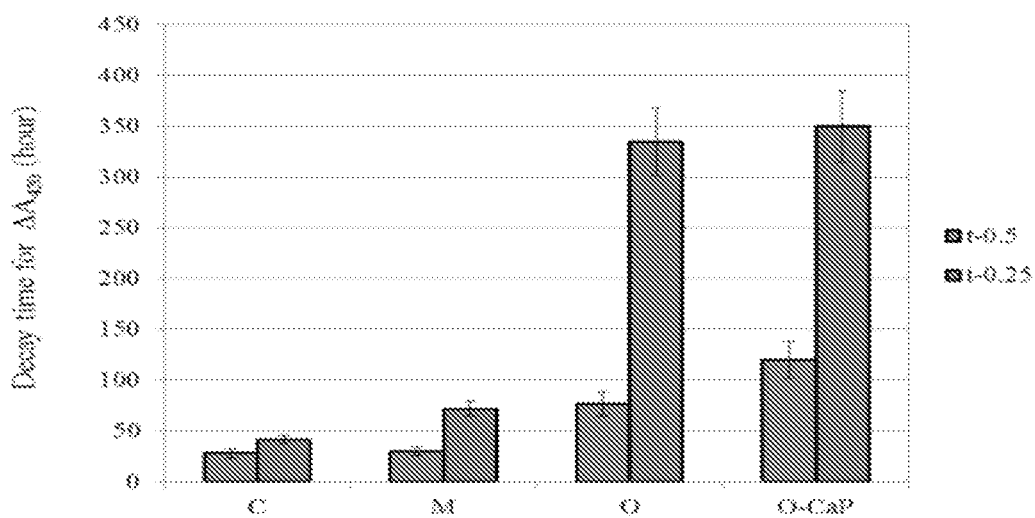
Figure 5:
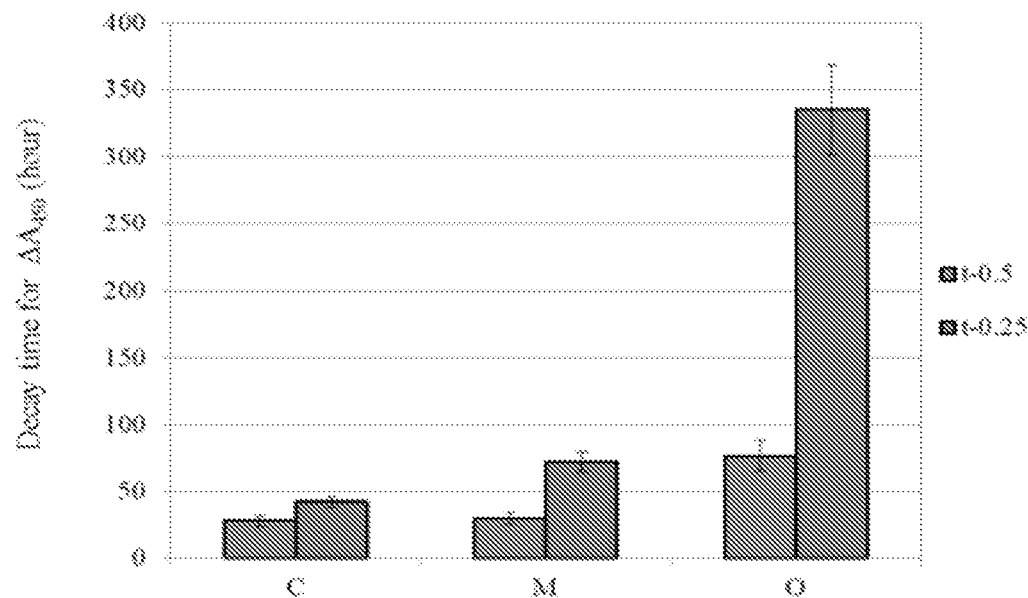
Figure 5:
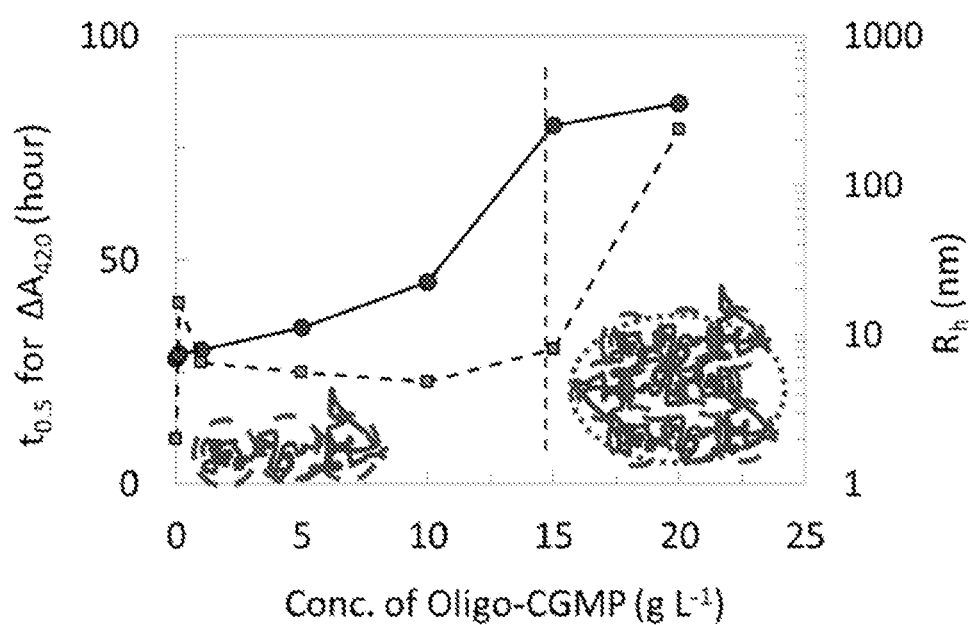

FIG. 5: Encapsulation and stabilization of curcumin and β-carotene in self-assembled oligo-CGMP micelles (association colloids).

Figure 6:
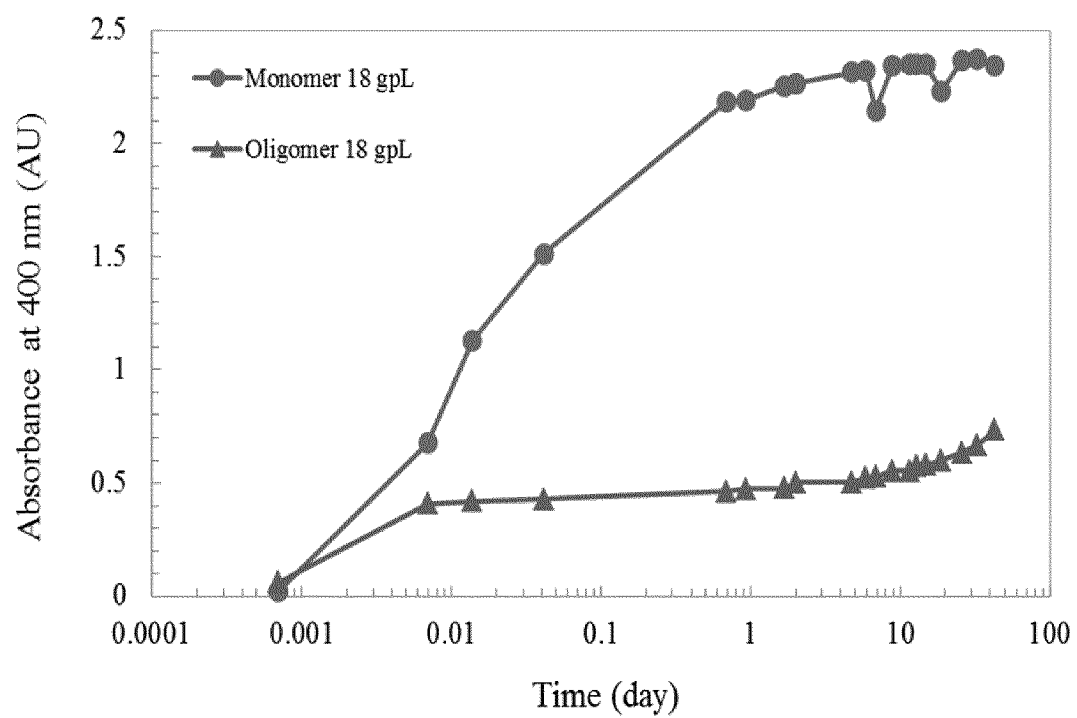

FIG. 6: Reduced gelation propensity of oligo-CGMP at acidic pH as compared to monomeric CGMP.

Figure 7:
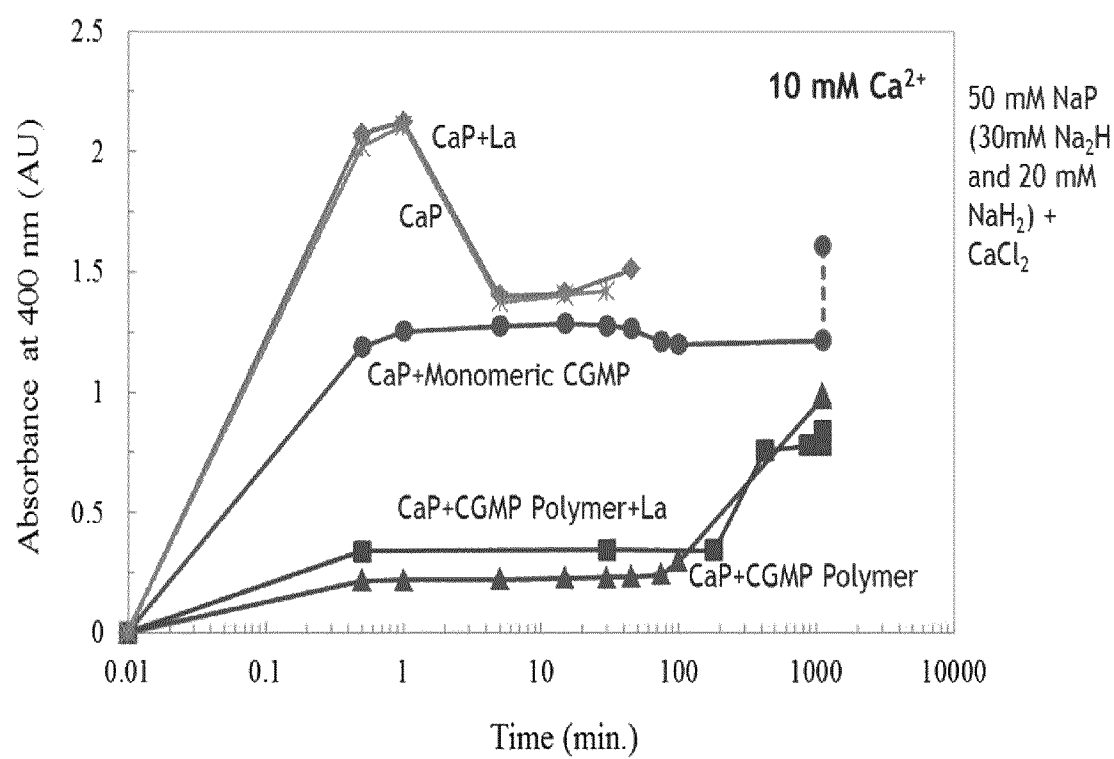

FIG. 7: Kinetics of turbidity build-up due to precipitation of calcium phosphate (CaP) at neutral pH and in presence or absence of 10 g $L^{-1}$ of CGMP polymers and monomers. The ionic concentrations are indicated in the text. One example of CaP particle formation in the presence of both the CGMP polymers and lactase enzyme (La) is also shown.

Figure 8:
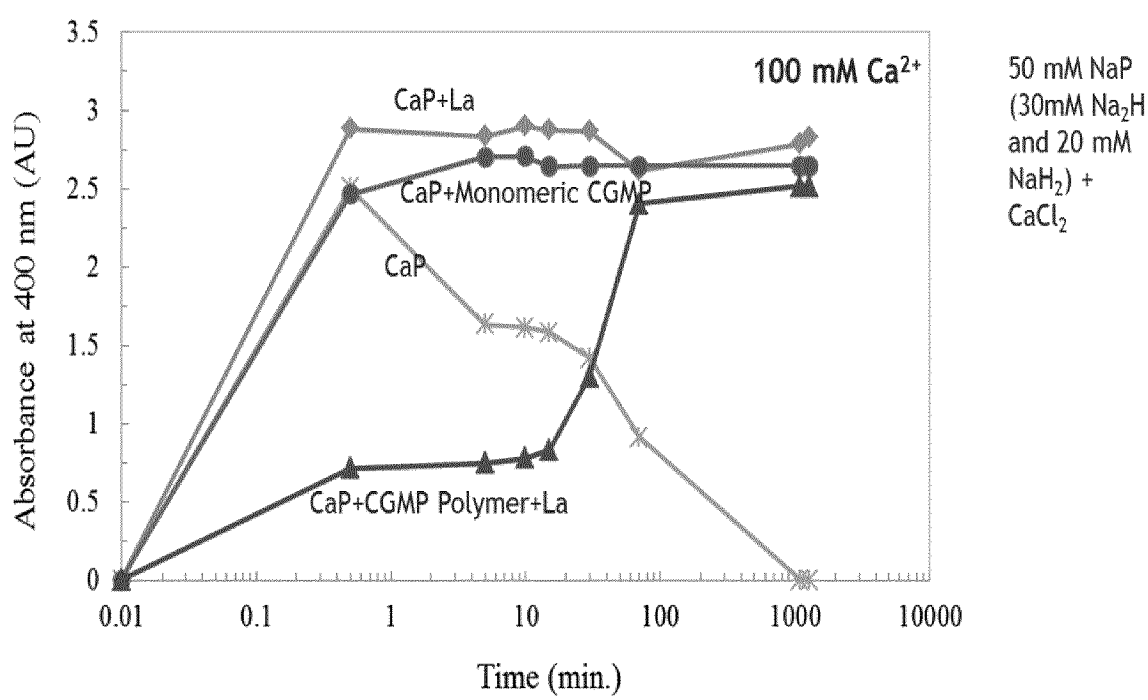

FIG. 8: Kinetics of turbidity build-up due to precipitation of calcium phosphate (CaP) in presence of higher concentration of $Ca^{2+}$ ions (100 mM). The other conditions are the same as shown in FIG. 1.

Figure 9:
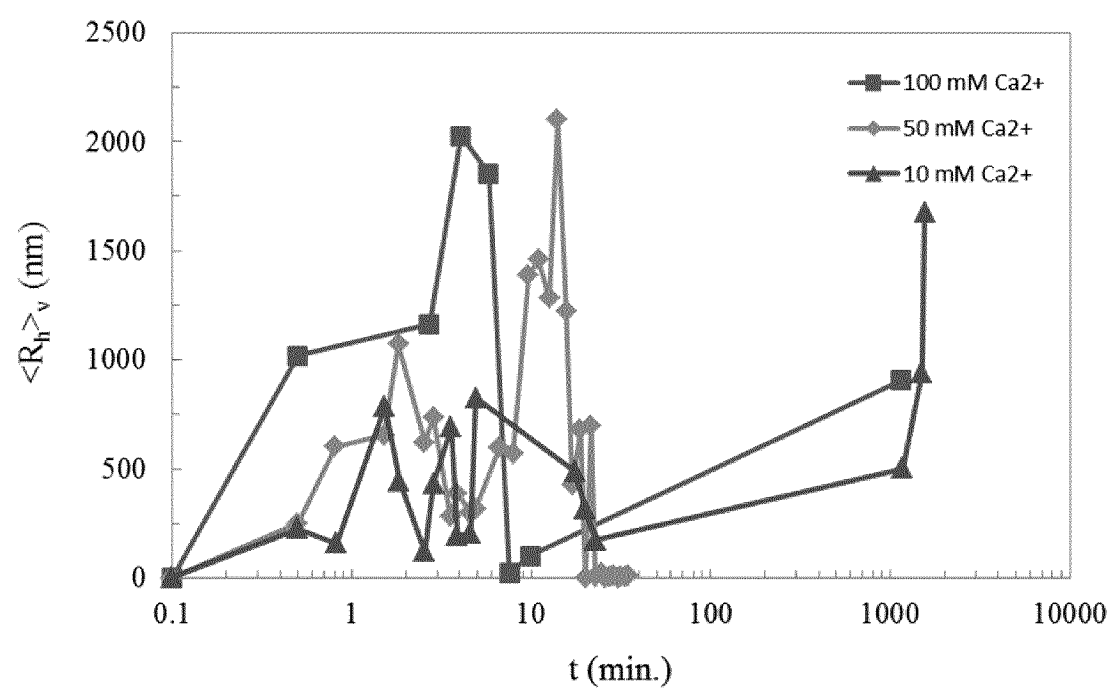

FIG. 9: Time variation in volume averaged hydrodynamic radius ($R_h$) of CaP particles formed in presence of monomeric CGMP. Three different measurements with 10, 50 and 100 mM $Ca^{2+}$ are depicted.

Figure 10:
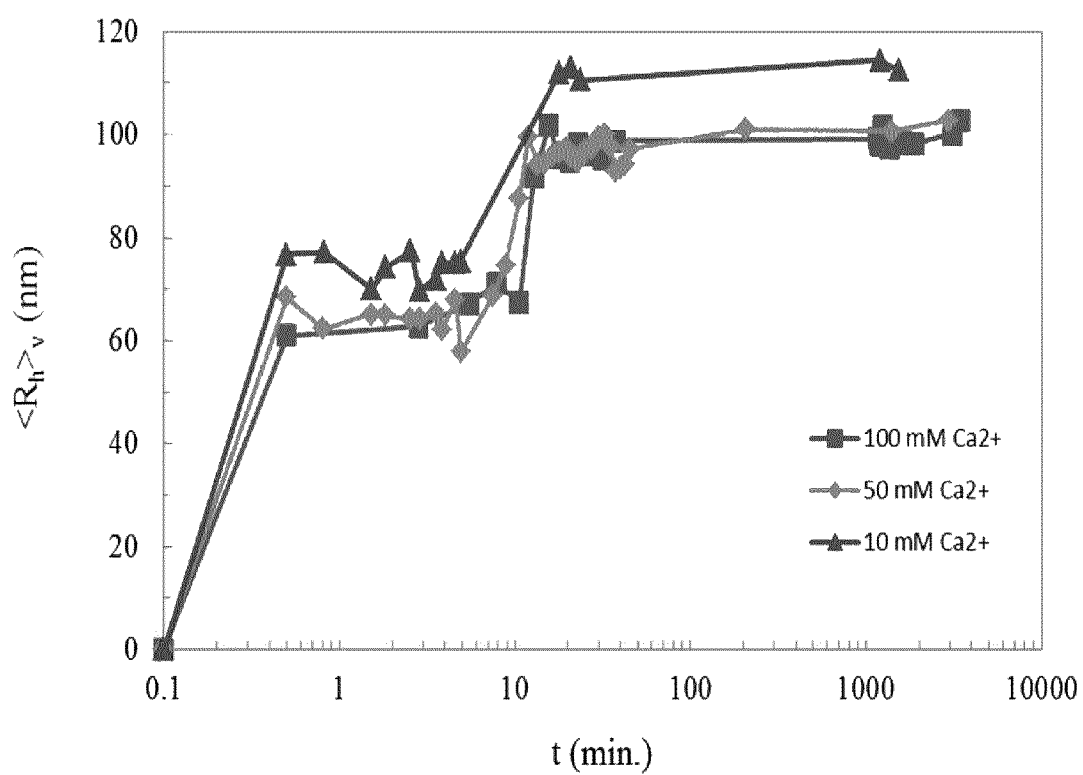

FIG. 10: Kinetics of CaP particle formation as assessed by measuring increase and plateau in volume averaged hydrodynamic radius ($R_h$) of CaP particles formed in the presence of oligomeric CGMP with increase in time after the addition of $Ca^{2+}$. The concentration of $Ca^{2+}$ in these experiments was 10, 50 and 100 mM.

Figure 11:
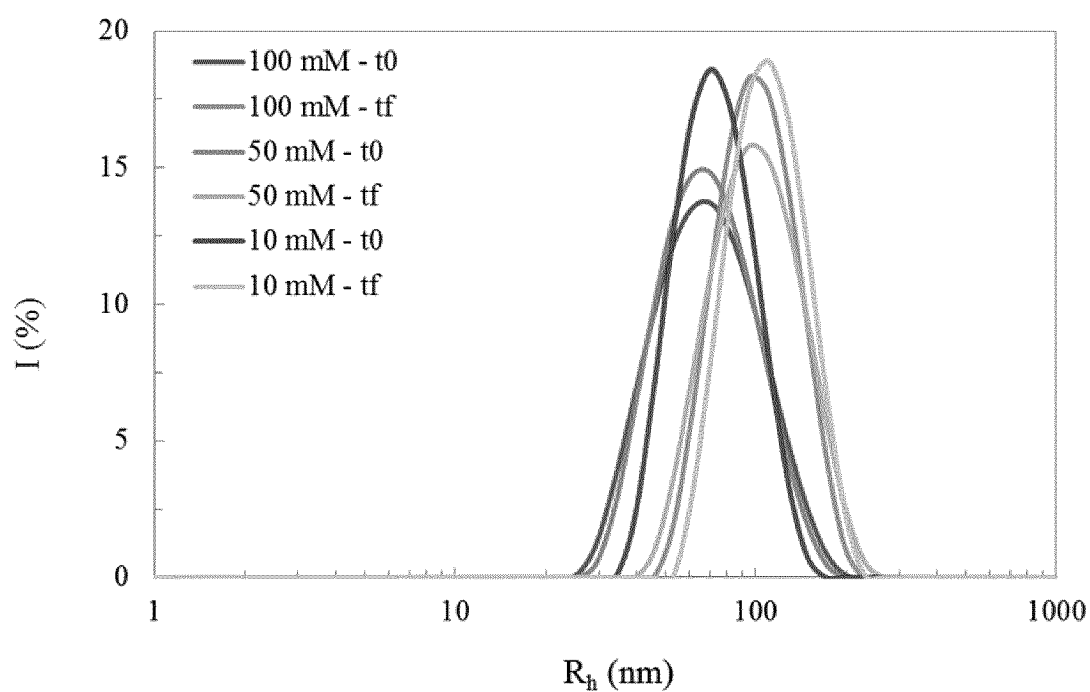

FIG. 11: Intensity based size distribution of CaP particles formed in presence of oligo-CGMP. Three different measurements with 10, 50 and 100 mM $Ca^{2+}$ are depicted just after adding calcium (t0) and after 72 h of incubation (tf).

Figure 12:
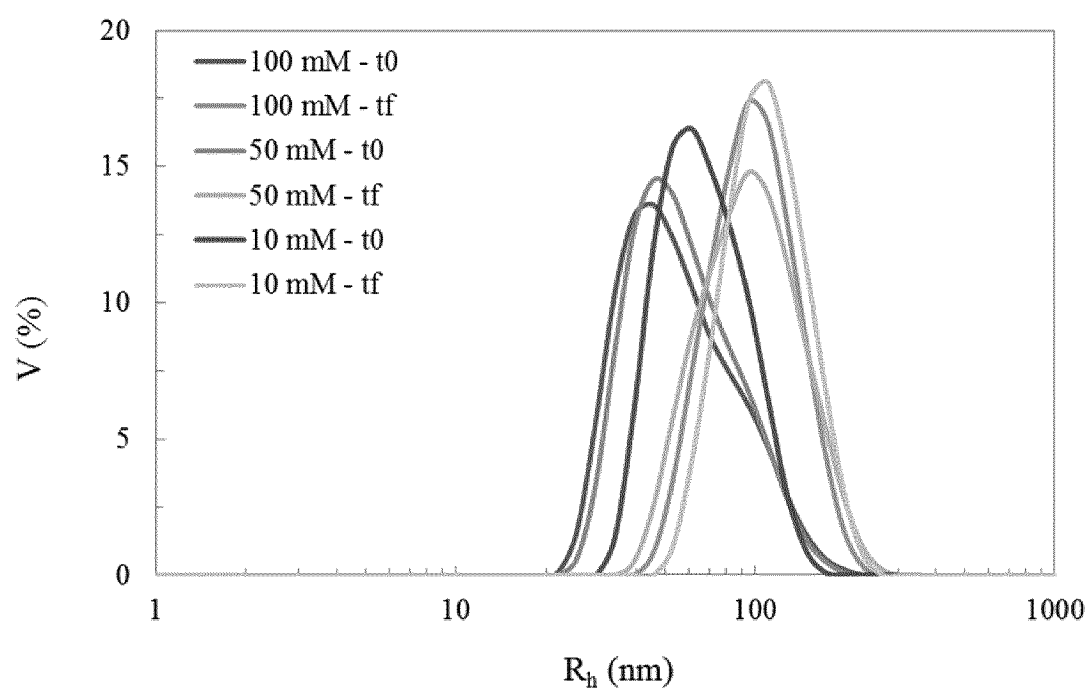

FIG. 12: Volume averaged size distribution of CaP particles formed in presence of oligo-CGMP. Three different measurements with 10, 50 and 100 mM $Ca^{2+}$ are depicted just after adding calcium (t0) and after 72 h of incubation (tf).

Figure 13:
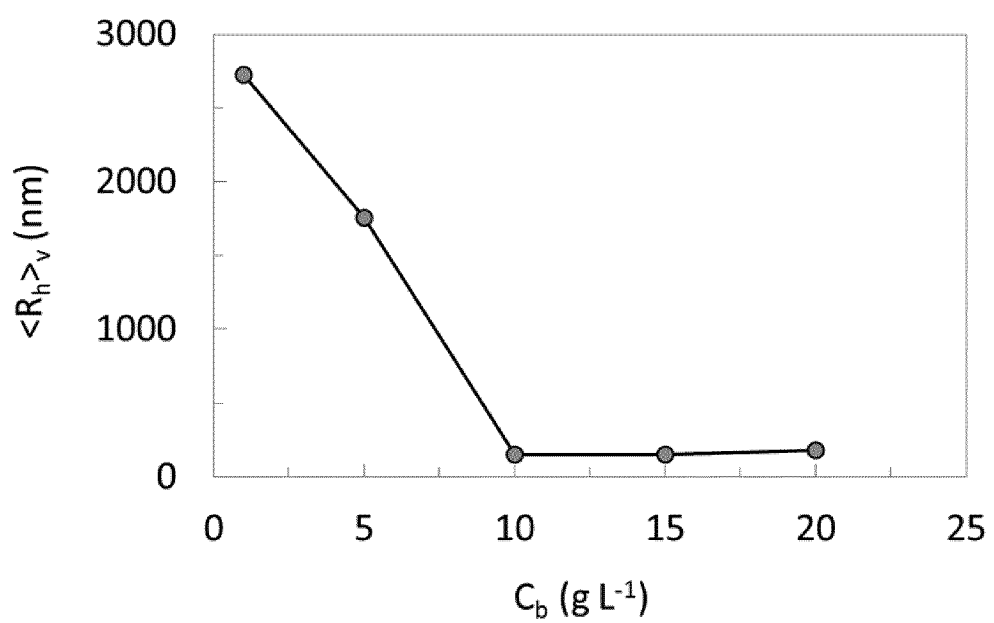

FIG. 13: Dependence of the volume averaged hydrodynamic radius ($R_h$) of CaP particles formed in presence of varying amounts of oligo-CGMP for a fixed concentration of $Ca^{2+}$ at 100 mM.

Figure 14:
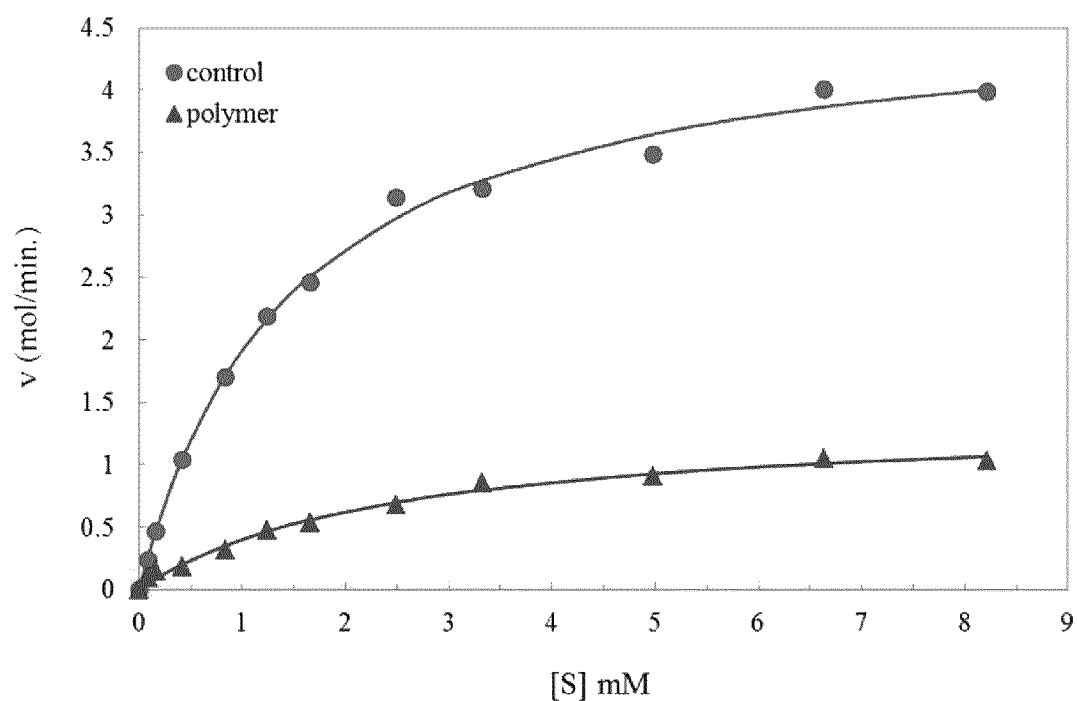

FIG. 14: Rate of product (ONP) formation (v) as catalyzed by free (control) Ha-Lactase or by encapsulated (oligomer) Ha-Lactase as a function of substrate (S, ONPG) concentration.

FIG. 15: The Michaelis Menten parameters obtained for the free and encapsulated lactase.

Figure 16:
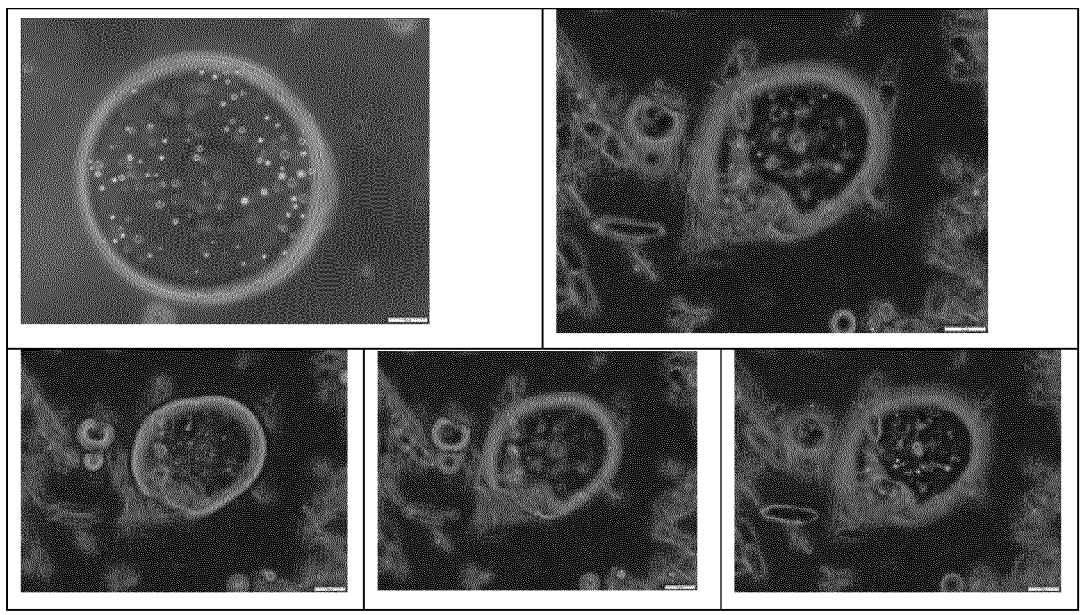

FIG. 16: Microcapsules made by double emulsion method. The images depict water in oil in water ($W_1/O/W_2$) type double emulsion. The inner water phase contains HaLactase which can be seen as finely dispersed small droplets within large drop. Top left picture is for double emulsion made only using oligomeric CGMP and top right picture is of double emulsion made using a combination of oligomeric CGMP and CaP. Bottom three pictures are images captured after focusing on different depths (moving from top to bottom of the drop). Large CaP particles can be clearly seen adsorbed at the drop interface.

Figure 17:
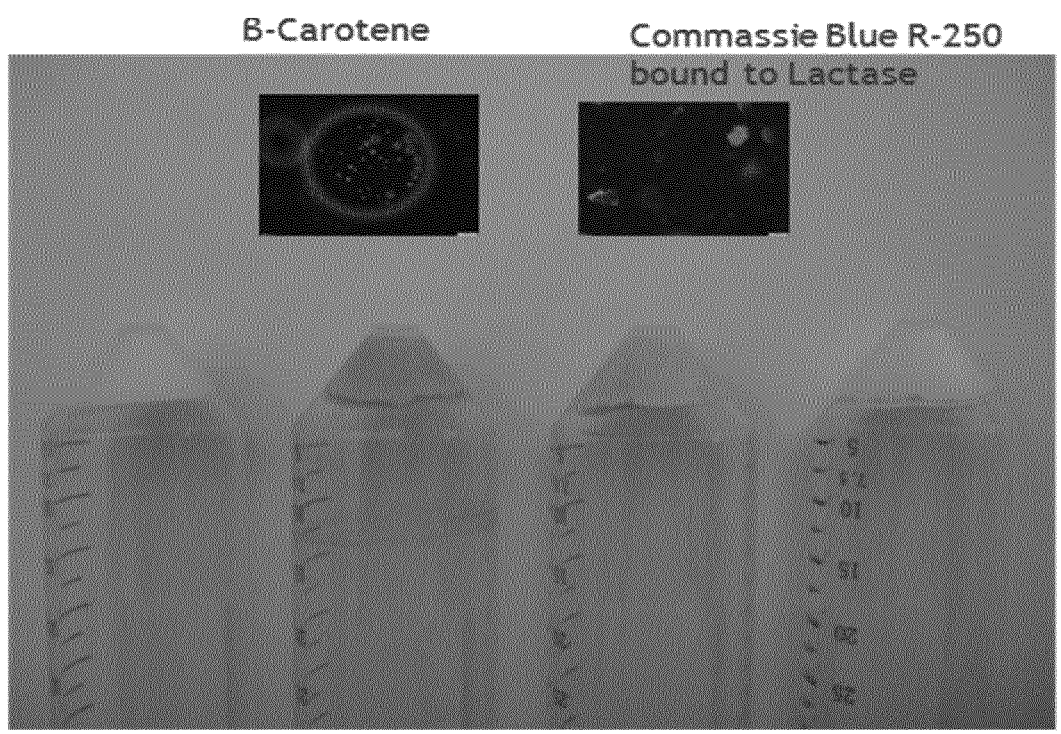

FIG. 17: Partitioning of colored microcapsules into the model cheese curd. The samples (from L to R) are control, red colored microcapsules, blue colored microcapsules and the control.

Figure 18:
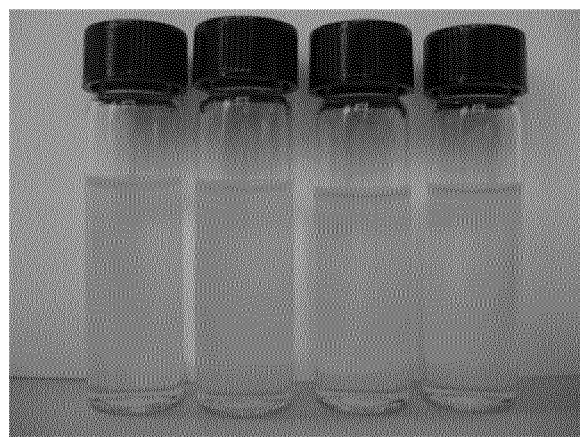

FIG. 18: The whey obtained at the end of the cheese making protocol. The whey samples correspond to the curd samples shown in FIG. 17.

Figure 19:
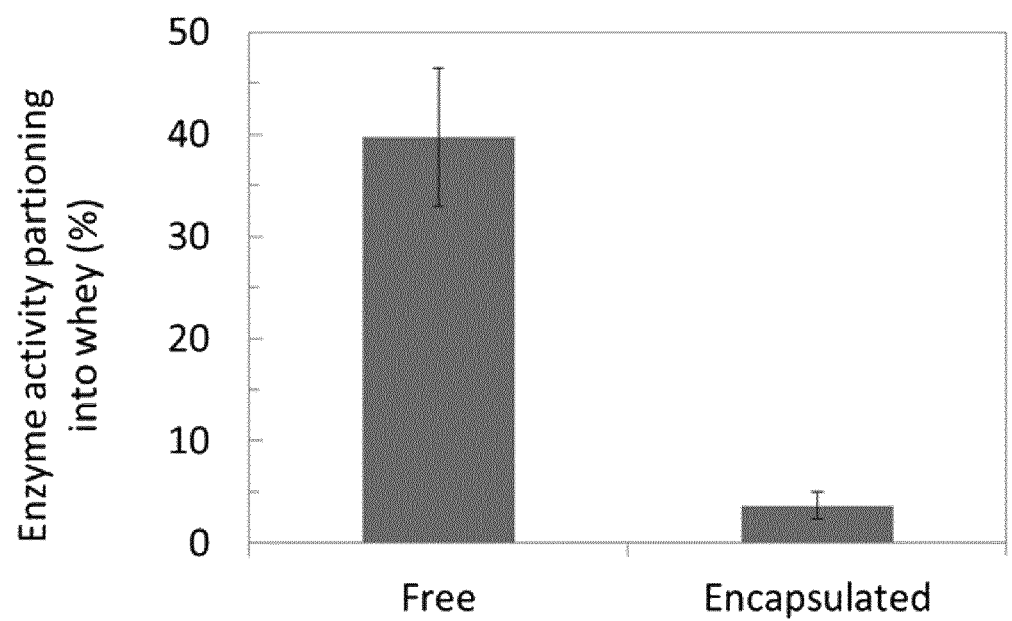

FIG. 19: Activity of the free and encapsulated lactase measured in the whey obtained from the model cheese making protocol.

Figure 20:
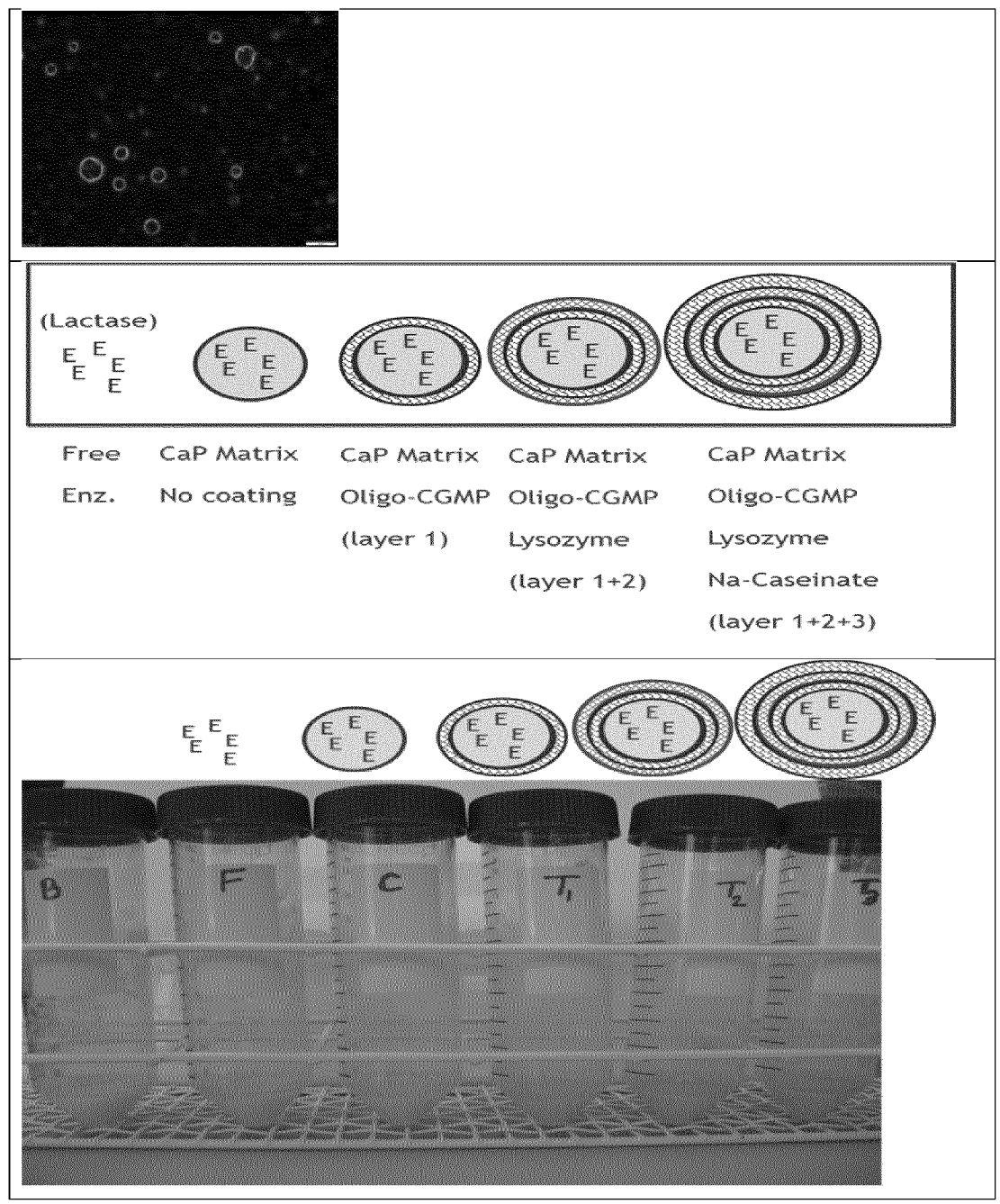

FIG. 20: Top: Microcapsules of oligo-CGMP stabilized CaP and the various coatings applied to them (middle). Bottom: Controlled delivery of encapsulated enzymes into cheese curd by varying the coating thickness.

FIG. 21: Illustrations of several functionalities of milk proteins useful for e.g. delivery tasks.

Figure 22:
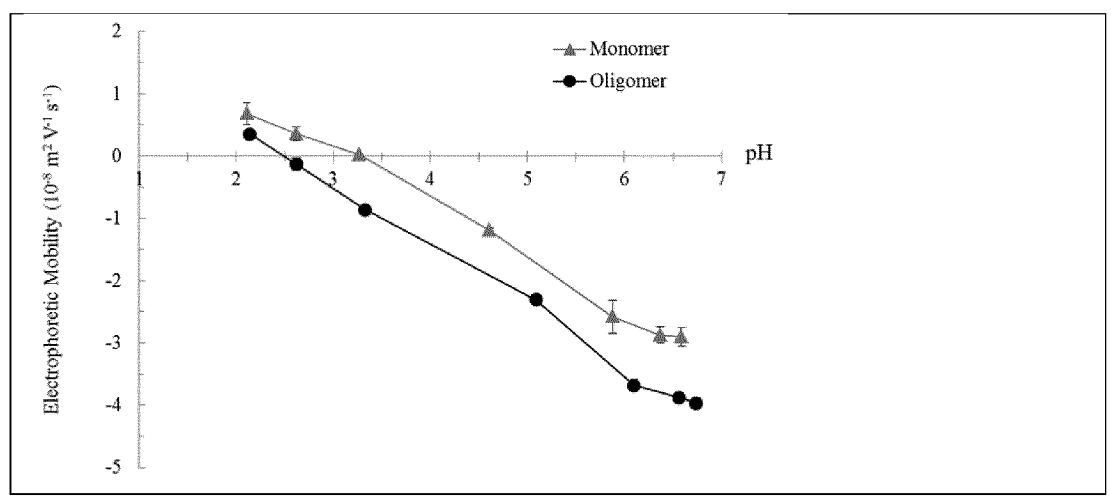

FIG. 22: Electrophoretic mobility of monomeric and oligomeric CGMP.

Figure 23:
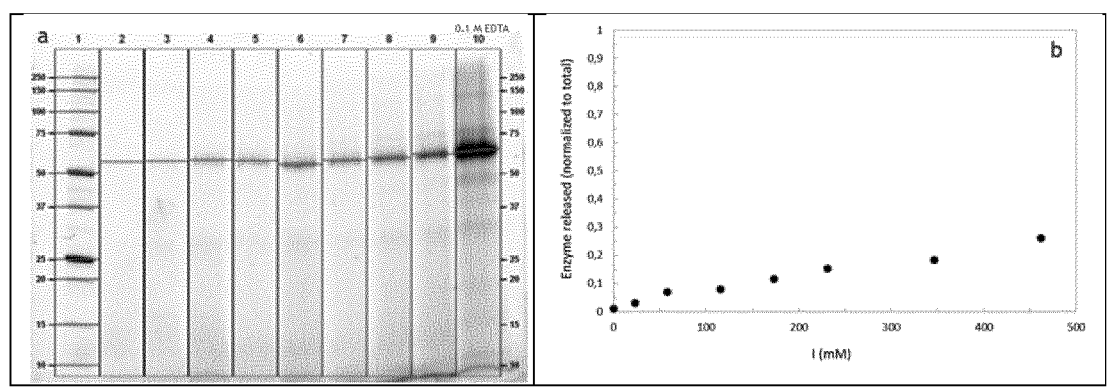

FIG. 23: (a) Lane 1=standard, lane 2=MQ-water, lanes 3-9=NaP buffer of ionic strengths increasing from 20 to 460 mM and lane 10=200 mM NaP buffer+0.1 M EDTA. (b) The amount of LOX release from the particles as a function of increasing ionic strength of the solution in which particles were suspended.

Figure 24:
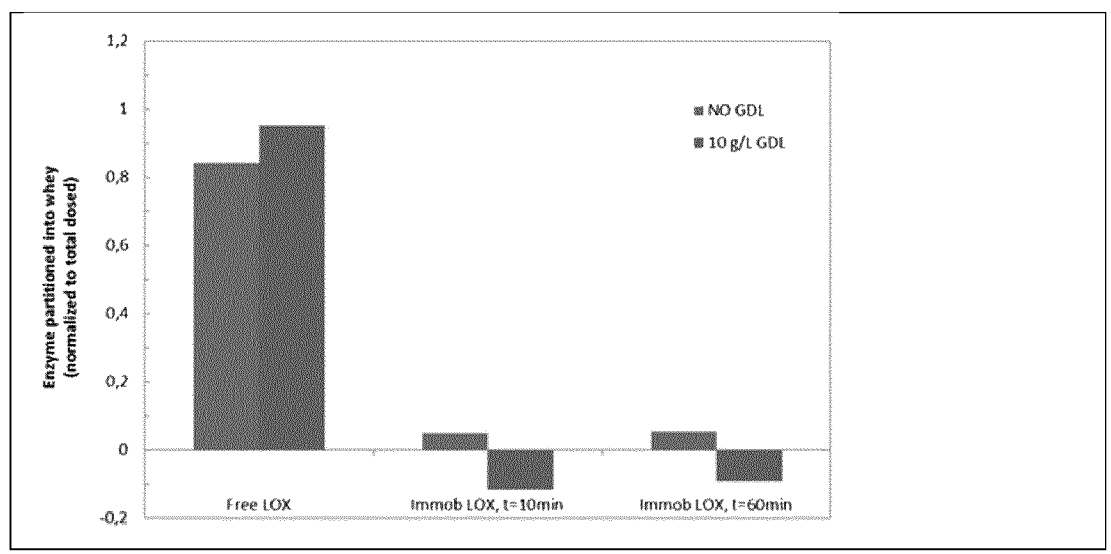

FIG. 24: The amount of LOX partitioned into whey as compared to the initial total amount added to the milk in free or immobilized form.

Figure 25:
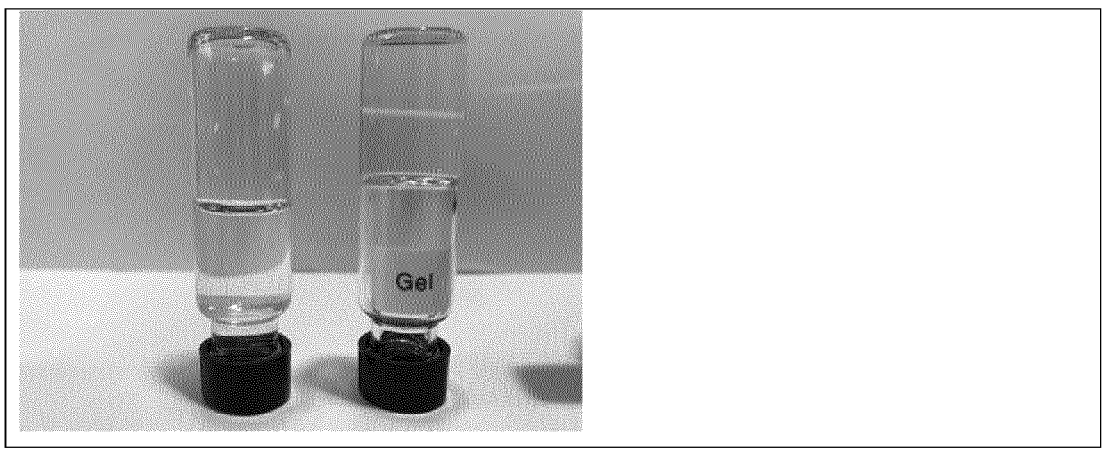

FIG. 25: Polymerized CGMP gel (right glass vial) made by cross-linking with mTG. The red laser beam was introduced from right side and is visible inside the transparent gel due to scattering. The left side glass vial contains the viscous (not gelled) control sample.

Figure 26:
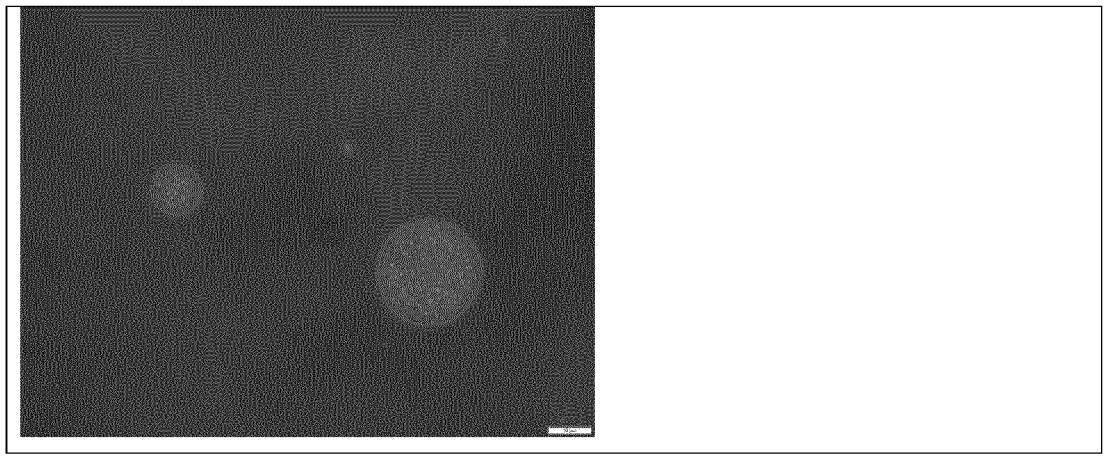

FIG. 26: Microencapsulation of bacteria in the 'gelled' inner water phase (W1) emulsified in oil phase (O) which contains PGPR. The W1/O emulsion was again emulsified in outer water phase (W2) which contained 60 g/L oligo-CGMP in 0.2 M sodium phosphate buffer (pH 7). The white bar in the image corresponds to a length scale of 10 µm.

Figure 27:
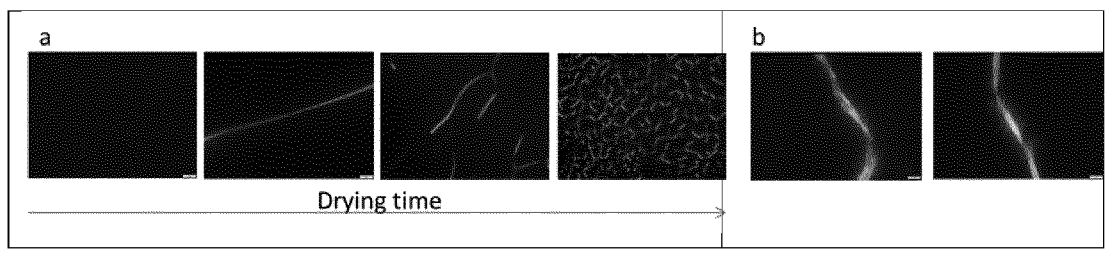

FIG. 27: (a) Birefringence observed in cross-polarized optical microscopic images as the oligo-CGMP gel was progressively dried at room temperature. (b) The assembled (ordered) fibrils forming a thick fiber (hierarchical assembly) with turns/twists was seen in some parts of the dried oligo-CGMP sample. The white bar in the image corresponds to a length scale of 10 µm.

DETAILED DESCRIPTION OF THE INVENTION

Food, Feed or Pharmaceutical Product

In principle, the food, feed or pharmaceutical product may be any herein commercial relevant product.

In relation to a food or feed product, a preferred food or feed product may be a milk-based product.

Preferably, the milk-based product is a dairy product such as e.g. a yogurt product or a cheese product.

Examples of a relevant pharmaceutical product could e.g. be a medicament, a tooth paste or bone cement.

In a preferred embodiment, the product is a food product—preferably, the feed product is a milk-based product (preferably a dairy product such as e.g. a yogurt product or a cheese product).

The milk may e.g. be soy milk, sheep milk, goat milk, buffalo milk, yak milk, lama milk, camel milk or cow milk.

It may be preferred that the dairy food product is a fermented milk product such as e.g. yogurt, quark, cheese, pizza cheese, drinking yoghurt, cheese spreads, skyr or soured whole milk.

Step (i)—Addition of a Composition Comprising CGMP Oligomers

As understood by the skilled person in the present context, the preferred amount of added composition comprising CGMP oligomers in step (i) will generally depend on the specific relevant desired functionality (e.g. as surface activity agent for colloid stabilization or for encapsulation of a bioactive (e.g. an enzyme)).

In relation to item (a) of the first aspect, it may be preferred that the product comprises after addition of the composition at least 2 mg (such as at least 5 mg, at least 10 mg, at least 100 mg or at least 1 g) of CGMP oligomers per kg of the product.

Composition Comprising CGMP Oligomers as Discussed Herein:

As discussed herein, the CGMP oligomers may e.g. be made by use of TGase based on e.g. whey, whey protein concentrate (WPC), whey protein isolate (WPI) or more purified monomeric CGMP (e.g. Lacprodan® CGMP-10 product) as starting "monomeric CGMP" material (see e.g. FIG. 1 and working examples herein).

As understood by the skilled person in the present context, the CGMP oligomers may be made by other methods (e.g. by chemically or photo-chemically crosslinking).

Preferably, the composition comprising CGMP oligomers is a composition obtained by adding Transglutaminase (TGase) to a whey sample under conditions wherein monomeric CGMP of the whey sample are cross-linked to thereby obtain CGMP oligomers and thereby the composition comprising CGMP oligomers.

Based on the teaching herein—it is routine work for the skilled person to identify suitable conditions (e.g. temperature, incubation time etc.) in order for the TGase to work properly and thereby to get a composition comprising a herein suitable amount of CGMP oligomers.

The whey sample may be whey or a more concentrated whey sample such as e.g. whey protein concentrate (WPC), whey protein isolate (WPI) or more purified monomeric CGMP (e.g. Lacprodan® CGMP-10 product).

The term "whey" is well known to the skilled person and it is understood that a whey sample will comprise a relatively little amount of milk/curd related proteins such as e.g. para-κ-casein and/or κ-casein.

Preferably, the whey sample is a whey sample, wherein the sample comprises at least 50% (such as at least 60%, at least 70%, at least 80%, at least 90%, at least 95%, at least 98% or at least 99%) of whey proteins (w/w of total protein content of the sample).

In working example herein was used the commercially available product Lacprodan® CGMP-10 as starting "monomeric CGMP" material—it comprises around 84% protein concentrate and the monomeric CGMP content is about 72% of the protein content. It is evident that by use of such concentrated monomeric CGMP starting material one may get a composition comprising CGMP oligomers with a relatively high concentration of CGMP oligomers—this may be preferred.

Accordingly, it may be preferred that the composition comprising CGMP oligomers relates to a composition comprising at least 2% (such as at least 5%, at least 10%, at least 20%, at least 30%, at least 40%, at least 50%, at least 60%, or at least 70%) of CGMP oligomers (w/w of total protein content of the composition).

It may be preferred that the composition comprising CGMP oligomers is a composition comprising from 0.00001 mg to 1 mg (such as from 0.0001 mg to 0.99 mg, from 0.001 mg to 0.99 mg or from 0.01 mg to 0.99 mg) of CGMP oligomers per mg of the composition.

In the above discussed A. Tolkach article a whey protein concentrate (WPC) was used as starting material—without being limited to theory it is believed that a CGMP oligomers composition with at least 30% of CGMP oligomers (w/w) is not directly and unambiguously disclosed in the A. Tolkach article.

Accordingly, a separate aspect of the invention relates to a composition comprising cross-linked, via intermolecular covalent isopeptide bonds, casein glycomacropeptide (CGMP) oligomers (CGMP oligomers), wherein the composition comprises:
  (a): at least 30% (preferably 40%, more preferably 50%) of CGMP oligomers (w/w of total protein content of the composition);
and wherein monomeric CGMP is the peptide containing the amino acid residues 106-169 of κ-casein and monomers of CGMP oligomers are monomeric CGMP.

It may be preferred that the CGMP oligomers composition comprises as little amount as possible of milk/curd related proteins such as para-κ-casein and/or κ-casein.

Accordingly, it may be preferred that the composition comprising CGMP oligomers is a composition, wherein the ratio CGMP oligomers/para-κ-casein+κ-casein (w/w) is higher than 1 (such as higher than 2, higher than 5, higher than 10 or higher than 100).

In working example 2 herein is discussed formation of CGMP oligomers—as discussed in this example 2, formation of CGMP oligomers of higher molar mass can be clearly seen in the size exclusion chromatograms (FIG. 2). It is known that the molar mass of monomeric CGMP varies between 6.7-11 kDa depending on the ratio of nonglycosylated and O-glycosylated CGMP.

In example 2 it was concluded that the molar mass of the created CGMP oligomers seems to be between 14-4000 kDa i.e. a degree of polymerization (DP) 2-600. The weight averaged DP seems to be 10-100.

The preferred averaged degree of polymerization (DP) may generally depend on the specific relevant desired functionality (e.g. as surface activity agent for colloid stabilization or for encapsulation of a bioactive (e.g. an enzyme).

In general it is preferred that the composition comprising CGMP oligomers is a composition, wherein the averaged degree of CGMP oligomer polymerization (DP) is from 2 to 100000 (such as from 3 to 10000, from 5 to 1000, from 8 to 200 or more preferably from 9 to 125).

In some cases, it may be preferred that the composition comprising CGMP oligomers is a composition, wherein the averaged degree of polymerization (DP) is from 20 to 1000 (such as from 20 to 500, from 30 to 300 or 40 to 125).

The herein used terms "CGMP oligomers" or "oligo-CGMP" cover herein a composition with e.g. relatively high averaged degree of polymerization (DP) (e.g. from 30 to 1000).

Sometimes may herein (e.g. in working examples herein) be referred to e.g. "polymeric CGMP"—as understood by the skilled person in the present context, "polymeric CGMP" will generally refer to a situation with relatively high averaged degree of polymerization (DP—e.g. averaged DP of more than 50).

A separate aspect of the invention relates to a composition comprising cross-linked, via intermolecular covalent isopeptide bonds, casein glycomacropeptide (CGMP) oligomers (CGMP oligomers), wherein the composition comprises:
  (a): at least 2% (such as at least 5%, at least 10%, at least 20%, at least 30%, at least 40%, at least 50%, at least 60%, or at least 70%) of CGMP oligomers (w/w of total protein content of the composition); and
  wherein the averaged degree of CGMP oligomer polymerization (DP) is from 2 to 100000 (such as from 3 to 10000, from 5 to 1000, from 8 to 200 or more preferably from 9 to 125);
  and wherein monomeric CGMP is the peptide containing the amino acid residues 106-169 of κ-casein and monomers of CGMP oligomers are monomeric CGMP.

As discussed in working example below, the present inventors found that, under appropriate conditions, the α-lactalbumin and β-lactoglobulin can also be modified by mTG and in fact hetero-oligomers/polymers can also be formed with CGMP. In the case of working example herein, there was small amount of α-lactalbumin and β-lactoglobulin present in the starting material and minor amounts of these whey proteins were found to be incorporated into the CGMP-oligomers.

There were not found any significant differences between homo oligo-CGMP and hetero oligo-CGMP with whey proteins (e.g. α-lactalbumin and/or β-lactoglobulin) incorporated in them. Hence, the functionality is broadly similar for the homo-oligomers and the hetero-oligomers.

The herein used terms "CGMP oligomers" or "oligo-CGMP" cover herein both homooligomers and the hetero-oligomers.

Novel Functionalities/Uses of CGMP Oligomers as Discussed Herein

As discussed above, the present inventors identified that covalently cross-linked CGMP (herein termed CGMP oligomers or oligo-CGMP) was found to have many new/novel improved functional properties that were not shown by the monomeric CGMP.

Preferred examples of such novel functionalities/uses are discussed below.

In a preferred embodiment, the in step (i) added CGMP oligomers are used for ion binding (e.g. Ca binding—preferably Calcium Phosphate (CaP) binding), encapsulation of a substance (e.g. a phytochemical such as e.g. curcumin or p-carotene), encapsulation of a molecule (e.g. enzyme such as e.g. lactase), gelation, responsive gel swelling for triggered (e.g. pH, ionic strength, temperature) release, covalent conjugation, electrostatic complex formation, or colloid stabilization (e.g. acidic stabilization, Pickering stabilization or via self-assembled structures/aggregates).

The same uses are preferred uses for separate aspect of the invention that relates to a composition comprising CGMP oligomers as such.

As discussed herein—Example 2 herein describes self-assembly (association/aggregation) of oligo-CGMP into 'casein-like' micelles (association colloids) and their use to encapsulate phytochemicals such as curcumin β-carotene—monomeric CGMP did not properly show this property of self-assembly and thereby usefulness to encapsulate phytochemicals such as curcumin and β-carotene.

Accordingly, it is preferred that the CGMP oligomers of item (a) are self-assembled (aggregated) CGMP oligomer particles.

Preferably, the self-assembled (aggregated) CGMP oligomer particles comprise encapsulated substances (e.g. two or more curcumin molecules).

As understood by the skilled person in the present context, the averaged degree of polymerization (DP) relates to cross-linking, via intermolecular covalent isopeptide bonds, of the CGMP monomers to get the CGMP oligomers.

Accordingly, self-assembled (aggregated) CGMP oligomer particles may comprise two or more self-assembled CGMP oligomers with different degree of polymerization (DP) of the individual CGMP oligomer molecules as present in the self-assembled (aggregated) CGMP oligomer particles.

Preferably, a self-assembled (aggregated) CGMP oligomer particle comprises from 2 to 100000 (such as from 3 to 10000 or from 5 to 1000) self-assembled individual CGMP oligomers.

See e.g. FIG. 21 herein for an illustration of self-assembled (aggregated) particles.

A separate aspect of the invention relates to a composition comprising cross-linked, via intermolecular covalent isopeptide bonds, casein glycomacropeptide (CGMP) oligomers (CGMP oligomers), wherein the composition comprises:

(a): at least 2% (such as at least 5%, at least 10%, at least 20%, at least 30%, at least 40%, at least 50%, at least 60%, or at least 70%) of CGMP oligomers (w/w of total protein content of the composition); and wherein the CGMP oligomers of item (a) are self-assembled (aggregated) CGMP oligomer particles, preferably wherein the self-assembled (aggregated) CGMP oligomer particles comprise encapsulated substances;

and wherein monomeric CGMP is the peptide containing the amino acid residues 106-169 of κ-casein and monomers of CGMP oligomers are monomeric CGMP.

The encapsulated substance may e.g. be a phytochemical such as e.g. curcumin, β-carotene or e.g. a color pigment (preferably a natural color pigment).

As understood by the skilled person, the encapsulation method can easily be extended to various other compound relevant for food applications such as water insoluble vitamins (D, E, K), fatty acids etc., which need to be protected by encapsulation.

Accordingly, the substance may e.g. be a water insoluble vitamin (such as e.g. vitamin D, E or K), mineral, peptide or a fatty acid As discussed herein—Example 3 herein describes use of the oligo-CGMP for making stable acidic CGMP based clear beverages which is not possible with the monomeric form, since the stability of monomeric CGMP in acidic beverages is not very good and it aggregates at low pH which leads to turbidity build-up in these beverages—accordingly, use of oligo-CGMP gives the possibility to make acidic protein rich based beverages based entirely on ingredients derived from milk.

Accordingly and in relation to the first aspect, the food, feed or pharmaceutical product is preferably a product with a pH below pH 5.

Preferably, the product is a beverage (preferably for human consumption) with a pH below pH 5.

When the product is a product with such a low/acidic pH—it is preferred that the composition comprising CGMP oligomers is a composition, wherein the averaged degree of polymerization (DP) is from 3 to 100000 (such as from 4 to 1000, from 5 to 300 or 8 to 125).

As discussed above—Example 4 herein describes colloidal stabilization of calcium-salt based precipitated particles with oligo-CGMP and its use for calcium fortification. As described in the example, oligo-CGMP slow down the precipitation of calcium phosphate (CaP) particles much more effectively compared to its monomeric form.

In other words, the oligo-CGMP can interact with calcium phosphate (CaP) and act as the stabilizer of the CaP particles. It can colloidally stabilize CaP particles. Hence, CaP particles of any desired size range e.g. 50 nm to >10 µm can be prepared in a very controlled manner. In addition, the oligo-CGMP seems to be acting as stabilizer for other calcium salts as well. For example, results similar to CaP have been observed with calcium carbonate (CaC). Based on this, it is expected that similar results for a wide variety of calcium salts may be obtained—such as for Calcium sulfate (CaS) or Calcium Oxalate (CaOx).

A herein relevant use is e.g. use of oligo-CGMP-Calcium salt particles (e.g. oligo-CGMP-CaP) for the purpose of calcium fortification in dairy based beverages and other drinks/beverages where calcium fortification is desired with colloidally stable calcium based particles which do not results in problems associated with free calcium or with larger sized particles that settle down under gravity or can be negatively perceived by consumers as gritty mouth feel. Calcium fortification with calcium based particles would otherwise require the use of hydrocolloid or surfactant (dispersant) based stabilizers.

Accordingly, it is preferred that the CGMP oligomers of item (a) are CGMP oligomer-Ca particles (preferably CGMP oligomer-CaP particles or CGMP oligomer—CaC particles (most preferably CGMP oligomer-CaP particles)).

The particles may preferably be of a size between from 10 nm to 1000 µm (preferably from 25 nm to 750 µm, more preferably from 50 nm to 100 µm).

A preferred use is for calcium fortification beverage (e.g. in dairy based beverage). Another preferred use is as Pickering stabilizers for making stable emulsions and/or foams.

As known in the art—a Pickering emulsion is an emulsion that is stabilized by solid particles which adsorb onto the interface between the two phases.

When the CGMP oligomers of item (a) are CGMP oligomer-Ca particles—it is preferred that the composition comprising CGMP oligomers is a composition, wherein the averaged degree of polymerization (DP) is from 3 to 100000 (such as from 4 to 1000, from 6 to 300 or 8 to 125).

A separate aspect of the invention relates to a composition comprising cross-linked, via intermolecular covalent isopeptide bonds, casein glycomacropeptide (CGMP) oligomers (CGMP oligomers), wherein the composition comprises:
(a): at least 2% (such as at least 5%, at least 10%, at least 20%, at least 30%, at least 40%, at least 50%, at least 60%, or at least 70%) of CGMP oligomers (w/w of total protein content of the composition); and
wherein the CGMP oligomers of item (a) are CGMP oligomer-Ca particles, preferably GMP oligomer-CaP particles or GMP oligomer-CaC particles (most preferably GMP oligomer-CaP particles);
and wherein monomeric CGMP is the peptide containing the amino acid residues 106-169 of κ-casein and monomers of CGMP oligomers are monomeric CGMP.

The particles may preferably be of a size between from 10 nm to 1000 μm (preferably from 25 nm to 750 μm, more preferably from 50 nm to 100 μm).

A preferred use is for calcium fortification of e.g. a beverage (e.g. in dairy based beverage).

Another preferred use is as Pickering stabilizers for e.g. making stable emulsions and/or foams.

As discussed herein—Example 5 herein describes colloidal stabilization of calcium-salt based precipitated particles with oligo-CGMP and its use for encapsulation (e.g. controlled delivery and release of dairy enzymes into cheese matrix) and use of oligo-CGMP for Pickering stabilization of emulsions. For instance, the enzyme lactase was found to be effectively encapsulated and most the enzyme activity was retained in the curd (i.e. no signification amount of enzyme in the whey).

Example 5 also describes use of the meso-porous/macro-porous particles of the controlled size obtained by combinations of calcium salt (e.g. CaP/CaC) and oligo-CGMP for the purpose of encapsulating wide variety of molecules such as curcumin, bacteriocins such as nisin, lysozyme, dairy enzyme, probiotic bacteria etc.

Also relevant to note the described use of oligo-CGMP-CaP particles as such or coated with suitable dairy ingredient based coatings (such as caseinates, whey proteins, modified whey proteins, lysozyme, milk fat, lecithin etc.) for encapsulation of cheese ripening enzymes so that they can be preferentially delivered and released into the cheese curd matrix and their leakage into the whey can be minimized.

Accordingly, it is preferred that the CGMP oligomers of item (a) are CGMP oligomer-Ca particles (preferably CGMP oligomer-CaP particles or CGMP oligomer-CaC particles (most preferably CGMP oligomer-CaP particles)) that comprise encapsulated molecules.

The particles may preferably be of a size between from 10 nm to 1000 μm (preferably from 25 nm to 750 μm, more preferably from 50 nm to 100 μm).

When the CGMP oligomers of item (a) are CGMP oligomer-Ca particles that comprise encapsulated molecules—it is preferred that the composition comprising CGMP oligomers is a composition, wherein the averaged degree of polymerization (DP) is from 3 to 100000 (such as from 4 to 1000, from 6 to 300 or 8 to 125).

A separate aspect of the invention relates to a composition comprising cross-linked, via intermolecular covalent isopeptide bonds, casein glycomacropeptide (CGMP) oligomers (CGMP oligomers), wherein the composition comprises:
(a): at least 2% (such as at least 5%, at least 10%, at least 20%, at least 30%, at least 40%, at least 50%, at least 60%, or at least 70%) of CGMP oligomers (w/w of total protein content of the composition); and
wherein the CGMP oligomers of item (a) are CGMP oligomer-Ca particles (preferably CGMP oligomer-CaP particles or CGMP oligomer-CaC particles (most preferably CGMP oligomer-CaP particles)) that comprise encapsulated molecules;
and wherein monomeric CGMP is the peptide containing the amino acid residues 106-169 of κ-casein and monomers of CGMP oligomers are monomeric CGMP.

The particles may preferably be of a size between from 10 nm to 1000 μm (preferably from 25 nm to 750 μm, more preferably from 50 nm to 100 μm).

The encapsulated molecule may e.g. be a color pigment (e.g. curcumin), bacteriocin (such as e.g. nisin), enzyme (such as e.g. lysozyme, lactase or a dairy enzyme (e.g. Chymosin) or bacteria (e.g. probiotic bacteria).

When the CGMP oligomers of item (a) are CGMP oligomer-Ca particles that comprise encapsulated molecules (e.g. an enzyme)—it may be preferred that the product is a food product (preferably a milk-based product, such as a dairy product (e.g. a yogurt product or a cheese product)).

Based on the teaching herein—it is expected that the CGMP oligomers (e.g. combination of CGMP oligomer-Ca particles salt (oligo-CGMP-calcium salt such as e.g. oligo-CGMP-CaP)) could be useful for e.g. any of the applications listed below:

Oral health (teeth) applications where anti-cariogenic effect and encapsulation is desired;

Bone health (regeneration) applications;

Non-viral vector to deliver encapsulated molecules such as nucleic acids, DNA or RNA into the cells. The advantage being that CaP particles of very controlled size and encapsulation (entrapment) efficiency can be obtained and all the ingredients being very biocompatible;

To make calcium salt based ceramic particles of very controlled size, morphology, pore sizes etc. which can be used for many purposes e.g. affinity chromatography etc.;

To make bio-compatible particles/ceramics of controlled physico-chemical properties.

Aspects/Embodiments Herein—Presented in Claim Format

Herein described aspects and preferred embodiments of the invention may be presented/described in a so-called claim format—this is done below.

1. A method for making a new food, feed or pharmaceutical product comprising following step:
(i): addition of a composition comprising cross-linked, via intermolecular covalent isopeptide bonds, casein glycomacropeptide (CGMP) oligomers (CGMP oligomers) to a food, feed or pharmaceutical product in order to thereby make the new food, feed or pharmaceutical product and wherein:
(a): the product comprises after addition of the composition at least 1 mg of CGMP oligomers per kg of the product;
and wherein monomeric CGMP is the peptide containing the amino acid residues 106-169 of κ-casein and monomers of CGMP oligomers are monomeric CGMP.

2. The method of claim 1, wherein the product is a food product or feed product.

3. The method of claim 2, wherein the product is a food product.

4. The method of any of claims 2 to 3, wherein the product is a milk-based product, preferably the milk may e.g. be soy milk, sheep milk, goat milk, buffalo milk, yak milk, lama milk, camel milk or cow milk.

5. The method of claim 4, wherein the product is a fermented milk product.

6. The method of any of claims 3 to 5, wherein the product is a dairy product.

7. The method of claim 6, wherein the dairy product is yogurt, quark, cheese, pizza cheese, drinking yoghurt, cheese spreads, skyr or soured whole milk.

8. The method of claim 1, wherein the product is a pharmaceutical product.

9. The method of claim 8, wherein the pharmaceutical product is a medicament, a tooth paste or bone cements.

10. The method of any of the preceding claims, wherein in relation to item (a) of claim 1 the product comprises after addition of the composition at least 2 mg (such as at least 5 mg, at least 10 mg, at least 100 mg or at least 1 g) of CGMP oligomers per kg of the product.

11. The method of any of the preceding claims, wherein the composition comprising CGMP oligomers is a composition obtained by adding Transglutaminase (TGase) to a whey sample under conditions wherein monomeric CGMP of the whey sample are cross-linked to thereby obtain CGMP oligomers and thereby the composition comprising CGMP oligomers.

12. The method of claim 11, wherein the whey sample is whey or a more concentrated whey sample such as e.g. whey protein concentrate (WPC), whey protein isolate (WPI) or more purified monomeric CGMP (e.g. Lacprodan® CGMP-10 product), preferably wherein the whey sample comprises at least 50% (such as at least 60%, at least 70%, at least 80%, at least 90%, at least 95%, at least 98% or at least 99%) of whey proteins (w/w of total protein content of the sample).

13. The method of any of the preceding claims, wherein the composition comprising CGMP oligomers is a composition comprising at least 2% (such as at least 5%, at least 10%, at least 20%, at least 30%, at least 40%, at least 50%, at least 60%, or at least 70%) of CGMP oligomers (w/w of total protein content of the composition).

14. The method of any of the preceding claims, wherein the composition comprising CGMP oligomers is a composition comprising from 0.00001 mg to 1 mg (such as from 0.0001 mg to 0.99 mg, from 0.001 mg to 0.99 mg or from 0.01 mg to 0.99 mg) of CGMP oligomers per mg of the composition.

15. The method of any of the preceding claims, wherein the composition comprising CGMP oligomers is a composition, wherein the ratio CGMP oligomers/para-κ-casein+κ-casein (w/w) is higher than 1 (such as higher than 2, higher than 5, higher than 10 or higher than 100).

16. The method of any of the preceding claims, wherein the composition comprising CGMP oligomers is a composition, wherein the averaged degree of CGMP oligomer polymerization (DP) is from 2 to 100000 (such as from 3 to 10000, from 5 to 1000, from 8 to 200 or more preferably from 9 to 125).

17. The method of any of the preceding claims, wherein the in step (i) added CGMP oligomers are used for ion binding (e.g. Ca binding—preferably CaP binding), encapsulation of a substance (e.g. a phytochemical such as e.g. curcumin or p-carotene), encapsulation of a molecule (e.g. enzyme such as e.g. lactase), gelation, responsive gel swelling for triggered (e.g. pH, ionic strength, temperature) release, covalent conjugation, electrostatic complex formation, or colloid stabilization (e.g. acidic stabilization, Pickering stabilization or via self-assembled structures/aggregates).

18. The method of any of the preceding claims, wherein the CGMP oligomers of item (a) of claim 1 are self-assembled (aggregated) CGMP oligomer particles.

19. The method of claim 18, wherein the self-assembled (aggregated) CGMP oligomer particles comprise encapsulated substances (e.g. two or more curcumin molecules).

20. The method of any of claims 17 to 19, wherein the self-assembled (aggregated) CGMP oligomer particle comprises from 2 to 100000 (such as from 3 to 10000 or from 5 to 1000) self-assembled individual CGMP oligomers.

21. The method of any of claims 19 to 20, wherein the encapsulated substance is a phytochemical (such as e.g. curcumin, p-carotene), a color pigment (preferably a natural color pigment), a water insoluble vitamin (such as e.g. vitamin D, E or K), a mineral, a peptide or a fatty acid.

22. The method of any of the preceding claims, wherein the food, feed or pharmaceutical product is a product with a pH below pH 5.

23. The method of claim 22, wherein the product is a beverage (preferably for human consumption) with a pH below pH 5.

24. The method of any of claims 22 to 23, wherein the composition comprising CGMP oligomers is a composition, wherein the averaged degree of CGMP oligomer polymerization (DP) is from 3 to 100000 (such as from 4 to 1000, from 5 to 300 or 8 to 125).

25. The method of any of the preceding claims, wherein the CGMP oligomers of item (a) are CGMP oligomer-Ca particles (preferably CGMP oligomer-CaP particles or CGMP oligomer—CaC particles (most preferably CGMP oligomer-CaP particles)).

26. The method of claim 22, wherein the particles have a size between from 10 nm to 1000 μm (preferably from 25 nm to 750 μm, more preferably from 50 nm to 100 μm).

27. The method of any of claims 25 to 26, wherein the in step (i) added CGMP oligomer-Ca particles are used for calcium fortification of e.g. a beverage (e.g. a dairy based beverage) or are used as Pickering stabilizers for e.g. making stable emulsions and/or foams.

28. The method of any of claims 25 to 27, wherein the composition comprising CGMP oligomer-Ca particles is a composition, wherein the averaged degree of polymerization (DP) is from 3 to 100000 (such as from 4 to 1000, from 6 to 300 or 8 to 125).

29. The method of any of the preceding claims, wherein the CGMP oligomers of item (a) are CGMP oligomer-Ca particles (preferably CGMP oligomer-CaP particles or CGMP oligomer-CaC particles (most preferably CGMP oligomer-CaP particles)) that comprise encapsulated molecules.

30. The method of claim 29, wherein the particles have a size between from 10 nm to 1000 μm (preferably from 25 nm to 750 μm, more preferably from 50 nm to 100 μm).

31. The method of any of claims 29 to 30, wherein the composition comprising CGMP oligomer-Ca particles that comprise encapsulated molecules is a composition, wherein the averaged degree of polymerization (DP) is from 3 to 100000 (such as from 4 to 1000, from 6 to 300 or 8 to 125).

32. The method of any of claims 29 to 31, wherein the encapsulated molecule is a color pigment (e.g. curcumin), a bacteriocin (such as e.g. nisin), an enzyme (such as e.g. lysozyme, lactase or a dairy enzyme (e.g. Chymosin)) or bacteria (e.g. probiotic bacteria).

33. The method of any of claims 29 to 32, wherein the product is a food product (preferably a milk-based product, such as a dairy product (e.g. a yogurt product or a cheese product)).

34. A food, a feed or a pharmaceutical product obtainable by the method of any of the preceding claims.

35. The food, a feed or a pharmaceutical product of claim 34, where the term "obtainable" is "obtained".

36. A composition comprising cross-linked, via intermolecular covalent isopeptide bonds, casein glycomacropeptide (CGMP) oligomers (CGMP oligomers), wherein the composition comprises:
  (a): at least 30% (preferably 40%, more preferably 50%) of CGMP oligomers (w/w of total protein content of the composition);
  and wherein monomeric CGMP is the peptide containing the amino acid residues 106-169 of κ-casein and monomers of CGMP oligomers are monomeric CGMP.

37. A composition comprising cross-linked, via intermolecular covalent isopeptide bonds, casein glycomacropeptide (CGMP) oligomers (CGMP oligomers), wherein the composition comprises:
  (a): at least 2% (such as at least 5%, at least 10%, at least 20%, at least 30%, at least 40%, at least 50%, at least 60%, or at least 70%) of CGMP oligomers (w/w of total protein content of the composition); and
  wherein the averaged degree of CGMP oligomer polymerization (DP) is from 2 to 100000 (such as from 3 to 10000, from 5 to 1000, from 8 to 200 or more preferably from 9 to 125);
  and wherein monomeric CGMP is the peptide containing the amino acid residues 106-169 of κ-casein and monomers of CGMP oligomers are monomeric CGMP.

38. A composition comprising cross-linked, via intermolecular covalent isopeptide bonds, casein glycomacropeptide (CGMP) oligomers (CGMP oligomers), wherein the composition comprises:
  (a): at least 2% (such as at least 5%, at least 10%, at least 20%, at least 30%, at least 40%, at least 50%, at least 60%, or at least 70%) of CGMP oligomers (w/w of total protein content of the composition); and
  wherein the CGMP oligomers of item (a) are self-assembled (aggregated) CGMP oligomer particles;
  and wherein monomeric CGMP is the peptide containing the amino acid residues 106-169 of κ-casein and monomers of CGMP oligomers are monomeric CGMP.

39. The composition of claim 38, wherein the self-assembled (aggregated) CGMP oligomer particles comprise encapsulated substances.

40. The composition of any of claims 38 to 39, wherein the self-assembled (aggregated) CGMP oligomer particle comprises from 2 to 100000 (such as from 3 to 10000 or from 5 to 1000) self-assembled individual CGMP oligomers.

41. The composition of any of claims 38 to 40, wherein the encapsulated substance is a phytochemical (such as e.g. curcumin, β-carotene), a color pigment (preferably a natural color pigment), a water insoluble vitamin (such as e.g. vitamin D, E or K), a mineral, a peptide or a fatty acid.

42. A composition comprising cross-linked, via intermolecular covalent isopeptide bonds, casein glycomacropeptide (CGMP) oligomers (CGMP oligomers), wherein the composition comprises:
  (a): at least 2% (such as at least 5%, at least 10%, at least 20%, at least 30%, at least 40%, at least 50%, at least 60%, or at least 70%) of CGMP oligomers (w/w of total protein content of the composition); and
  wherein the CGMP oligomers of item (a) are CGMP oligomer-Ca particles, preferably GMP oligomer-CaP particles or GMP oligomer-CaC particles (most preferably GMP oligomer-CaP particles);
  and wherein monomeric CGMP is the peptide containing the amino acid residues 106-169 of κ-casein and monomers of CGMP oligomers are monomeric CGMP.

43. The composition of claim 42, wherein the particles have a size between from 10 nm to 1000 μm (preferably from 25 nm to 750 μm, more preferably from 50 nm to 100 μm).

44. The composition of any of claims 42 to 43, wherein the composition comprising CGMP oligomer-Ca particles is a composition, wherein the averaged degree of polymerization (DP) is from 3 to 100000 (such as from 4 to 1000, from 6 to 300 or 8 to 125).

45. A composition comprising cross-linked, via intermolecular covalent isopeptide bonds, casein glycomacropeptide (CGMP) oligomers (CGMP oligomers), wherein the composition comprises:
  (a): at least 2% (such as at least 5%, at least 10%, at least 20%, at least 30%, at least 40%, at least 50%, at least 60%, or at least 70%) of CGMP oligomers (w/w of total protein content of the composition); and
  wherein the CGMP oligomers of item (a) are CGMP oligomer-Ca particles (preferably CGMP oligomer-CaP particles or CGMP oligomer-CaC particles (most preferably CGMP oligomer-CaP particles)) that comprise encapsulated molecules;
  and wherein monomeric CGMP is the peptide containing the amino acid residues 106-169 of κ-casein and monomers of CGMP oligomers are monomeric CGMP.

46. The composition of claim 45, wherein the particles have a size between from 10 nm to 1000 μm (preferably from 25 nm to 750 μm, more preferably from 50 nm to 100 μm).

47. The composition of any of claims 44 to 45, wherein the composition comprising CGMP oligomer-Ca particles that comprise encapsulated molecules is a composition, wherein the averaged degree of polymerization (DP) is from 3 to 100000 (such as from 4 to 1000, from 6 to 300 or 8 to 125).

48. The composition of any of claims 44 to 47, wherein the encapsulated molecule is a color pigment (e.g. curcumin), a bacteriocin (such as e.g. nisin), an enzyme (such as e.g. lysozyme, lactase or a dairy enzyme (e.g. Chymosin)) or bacteria (e.g. probiotic bacteria).

49. The method of any of claims 1 to 33, wherein the composition is a composition of claim 36.

50. The method of any of claims 1 to 33, wherein the composition is a composition of claim 37.

51. The method of any of claims 1 to 33, wherein the composition is a composition of any of claims 38-41.

52. The method of any of claims 1 to 33, wherein the composition is a composition of any of claims 42-44.

53. The method of any of claims 1 to 33, wherein the composition is a composition of any of claims 45-48.

EXAMPLES

As understood, when there in working examples below is referred to "we" there is referred to the present inventors.

Example 1—Materials and Methods

Materials

The commercial sample of casein glycomacropeptide (CGMP) was procured from Aria Food Ingredients, Denmark with the trademark Lacprodan® CGMP-10. As per supplier's information, this CGMP (our starting material) had both fat and lactose ≤0.2%, and 84.6% protein concentrate approx. dry matter. The CGMP content was about 72.67% of the protein content. The sialic acid content of the CGMP was around 6.2%. Microbial transglutaminase (mTG) was obtained from Leveking and is sold with a trade name: Leveking TG. It has an appearance of a white powder. This formulation of mTG has an effective pH range of 5.0 to 8.0 and the optimum pH is 6.0. The effective temperature range is 5 to 60° C. and the optimum temperature range is around 45 to 55° C. It is declared that the enzyme activity could keep over 80% for 12 months if stored under the following condition: 1) Keep away from sunlight and rainwater during transportation and storage and 2) Keep in a dry and well-ventilated environment below 25° C. Rests of the chemicals were of analytical grade.

Method

Solution Preparation

CGMP powder (30 mg) was suspended in 1 mL of 100 mM sodium phosphate buffer set at pH 7.04+100 mM NaCl+0.02% NaN$_3$ in an eppendorf tube to obtain a concentration of 30 g L$^{-1}$. The eppendorf tube was stirred at 1500 rpm on an eppendorf vibrator (IKA MS 3 Basic) for 1 minute and then was left overnight at 4° C. Next day, the eppendorf tubes were centrifuged at 13500×g (Mini Spin) for 1 hour at room temperature and then the supernatant was filtered with 0.2 μm syringe filter (Minisart SterileEO, Sartorius Stedim biotech).

Determination of Soluble CGMP Content by Drying Method

A 20 mL dispersion of 30 g L$^{-1}$ CGMP powder suspended in 100 mM sodium phosphate buffer+100 mM NaCl+0.05% NaN$_3$ set at pH 7 was prepared. Next, 1 mL of this solution was filled in ten different pre-weighted and numbered eppendorf tubes (2 mL capacity) and stirred at 1500 rpm on an eppendorf vibrator (IKA MS 3 Basic) and left overnight at 4° C. for complete hydration, solubilization and equilibration. Next day, the eppendorf tubes were centrifuged at 13500×g (Mini Spin) for 1 hour at room temperature and then the supernatant was carefully decanted from the tubes. The eppendorf tubes were then placed inside a fume hood and dried under a steady flow of air at room temperature. The weight of the numbered tubes was recorded after every 24 hours for a period of three consecutive days. The measured weight was corrected for the initial empty weight of the tubes. The corrected dry weight of the centrifuged pellet was averaged over the 10 tubes to obtain the average dry weight of the insoluble fraction i.e. pellet and the maximum error in the measurements.

Enzymatic Cross-Linking

The cross-linking of CGMP with mTG was performed at 40° C. using an CGMP:enzyme powder ratio of 10:1 (w/w) corresponding to a molar ratio of =100:1 CGMP:mTG. In short, 1.5 mL of the CGMP solution is filled in a 2 mL eppendorf tube and mTG powder was added to it to obtain the ratio as described above. The eppendorf tubes were then vortexed (2000 rpm, IKA MS 3 Basic) and kept for incubation at 40° C. in an eppendorf incubator (Eppendorf Thermo Mixer C, 2 mL) with continuous agitation at 500 rpm. Samples were taken after various time points (0-72 hours) of reaction and used for further analysis after inactivation of the residual mTG activity. The mTG was inactivated by heating the solution at 95° C. for 5 minutes. It was verified by functionality measurements that the heat treatment at 95° C. for 5 minutes did not result in any changes in the functionality of the soluble oligomers/polymers as compared to the nonheated ones. This indicated that size (molar mass) of the CGMP oligomers/polymers did not change due to this heat treatment and all the results observed are indeed due to cross-linked oligomers/polymers.

Size Exclusion Chromatography

The samples drawn at various time points were centrifuged at 13400×g for 90 s and then the supernatant was diluted to 3 g L$^{-1}$ in 100 mM sodium phosphate buffer+100 mM NaCl (pH=7). The samples were manually injected using a 100 μL loop. The column used was Superose 6 10/300 GL (GE Healthcare, Uppsala, Sweden) that has a column bed volume ~24 mL. The column was connected to an Äkta Purifier system and was operated at room temperature. The column was equilibrated and eluted with 10 mM sodium phosphate buffer pH 7.04 at a flow rate of 0.5 mL min-1. The eluate was monitored at 220 and 280 nm. Calibration data of the column from the supplier was used to get an approximate indication of the molar mass ranges and to judge the quality of separation and elution. As per the supplier's information, the column exclusion limit was ~4 MDa and the void volume (V0) is ~7 mL. The reported elution (retention) volumes (Ve of peak) for globular proteins eluted in 50 mM phosphate buffer containing 0.15 M NaCl at pH 7 and flow rate of 0.5 mL min-1 are ~12 mL for thyroglobulin (669 kDa), ~14.5 mL for ferritin (440 kDa), 16 mL for BSA (67 kDa) and ~18 mL for ribonuclease-A (13.7 kDa). To describe the size distribution of the products formed, the SEC chromatogram was divided in four regions: 7.0-8.0 mL (polymers), 8.0-15.0 mL (oligomers), 15.0-17.0 mL (monomers). For comparing the relative amounts, the monomeric, oligomeric and polymeric region was integrated to obtain the area under the peaks of absorbance measured at UV 220 nm, which is an indicator of the amount of material under the peaks. From this information the decrease in monomeric peptide and the increase in oligomers/polymers were estimated, arbitrarily assuming similar molar extinction coefficients for monomeric and oligomeric/polymeric forms. The fraction of each species was taken to be the ratio of the area in the chromatogram for that particular species, divided by the total area. The increase in oligomer fractions was calculated to obtain the size (mass) distribution of the products.

CaP Precipitation Experiments

In a 2 mL plastic cuvette (1 cm path length), 0.5 mL of monomeric CGMP (20 g L$^{-1}$) or 0.5 mL of oligo-CGMP (20 g L$^{-1}$) was mixed with 0.5 mL of 0.1 M sodium phosphate buffer containing additional 0.1 M NaCl and set at pH 7.04. The mixing was achieved by pipetting in and out five times using the same tip. Finally, a fixed volume (e.g. 2, 10 or 20 μL) of CaCl$_2$ (50%, w/v) was added and the solution was rapidly mixed by pipetting in and out five times after which it was immediately put into the dynamic light scattering instrument and analyzed. The typical delay between the addition of CaCl$_2$ and start of analysis is around one minute.

If the particle size became much larger than about 1 μm and they started sedimenting under the influence of gravitational force, the average scattered intensity over the measurement duration is not constant and the results are unreliable. This happens only in the case of control experiment i.e. when only CaP is formed and the particles are too large leading to a very turbid solution. In the case of oligo-CGMP the particle size was in the 'nano' dimension and there were no artifacts due to multiple scattering. Hence the results are reproducible and precise.

Alternatively, the CaP precipitation experiments can also be performed by measuring turbidities in a spectrophotometer and these experiments were done as follows: In a 2 mL eppendorf tube, 0.5 mL of Ha-Lactase-5200 was mixed with 0.5 mL of 0.1 M sodium phosphate buffer containing additional 0.1 M NaCl and set at pH 7.04 (control experiment). For a blank experiment, 0.5 mL of MQ-water was used instead of the HaLactase. In the case of test solutions, 0.5 mL of MQ-water or Ha-Lactase-5200 was mixed with 0.5 mL of monomeric CGMP or polymeric CGMP at a fixed bulk concentration of 10 g L-1 dissolved in 0.1 M sodium phosphate buffer containing additional 0.1 M NaCl (pH 7.04). The mixing was achieved by using an eppendorf vortex mixer for 60 s (IKA MS 3 Basic). The mixed solution was then transferred to a 1 mL plastic cuvette of 1 cm path length. Finally, either 2 or 20 µL of $CaCl_2$ (50%, w/v) was added and the solution was rapidly mixed by pipetting in and out 6 times after which it was immediately put into the spectrophotometer (UV-1800, Shimadzu) and the absorbance was recorded as a function of time at a wavelength of 400 nm. The measured absorbance is an indicator of the turbidity of the solution, which in turn is the indicator of the particle size of the solution. The measured absorbance at time zero was corrected by subtracting the absorbance of the blank experiment. When the particle size became much larger than about 1 µm and they started sedimenting under the influence of gravitational force, the absorbance starts to decrease and this indicates the on-set of phase separation. For a stable suspension, the on-set of phase separation is delayed. For a fast precipitation reaction, the increase of absorbance with time is rapid while this slope decreases for the systems where precipitation is retarded due to slowing down of the CaP formation kinetics.

The exact control of the pH during or after the formation of CaP particles was optimized as follows:

In a 2 mL eppendorf tube, 0.5 mL of Ha-lactase was mixed with 0.5 mL of $Na_2HPO_4$ (C=0.05, 0.1, 0.2, and 0.3 M) by vigorously vortexing the eppendorf for 60 s and then turning it upside-down for 10 times. Next, 20 µL of CaCl2 was added to the above solution and the eppendorf was vortexed for 60 s (repeated 6 times i.e. 60 s vortex followed by 60 s rest and then next cycle of 60 s vortex, repeated 6 times). After this, the solution was left for 1 hour and then centrifuged at 13500 rpm for 5 minutes at room temperature. Next, the pH of the supernatant was accurately measured (accuracy up to second decimal point) using a pH meter (senslon PH3 from Hach fitted with Mettler toledo electrode). In a second set of experiment, the solution obtained after CaP precipitation from a 0.3 M $Na_2HPO_4$ strength was diluted with 1 mL of MQ-water or with 1 mL of $Na_2HPO_4$ (C=0.1, 0.2, and 0.3 M) and the pH of the supernatant was accurately measured.

Dynamic Light Scattering (DLS)

The hydrodynamic radius ($R_h$) was measured using a nano-zetasizer (Nano-ZS, model: ZEN 3600, Malvern Instruments, Worcestershire, UK) equipped with 633 nm laser. The samples were put in a 2 mL plastic cuvette with 10 mm path length (VWR cuvettes PS, semi-micro, cat. no. 634-0676, VWR Int. bvba, Germany). The measurements were performed at 25° C. in the automatic mode, in which the attenuator and the measurement position were selected automatically. The intensity fluctuations in the scattered light were measured at 173° C. for 30 s. Ten such scans were averaged to obtain the correlation curve. Next, intensity and volume based size distributions were calculated using the standard software of Malvern. The decay time from correlation curves is used for fitting the distribution of diffusion coefficients and then hydrodynamic radii are computed using Stokes'-Einstein equation. These steps were done automatically by selecting the general purpose model for fitting the distribution using cumulant analysis and specifying the output of hydrodynamic radius.

Aggregation Experiments at Low pH

In a 1.5 mL plastic cuvette of 1 cm path length, 900 µL of 10 g L-1 monomeric or polymeric CGMP dissolved in MQ-water was taken and then 100 µL of 1 M HCl was added and the solution was rapidly mixed by pipetting in and out 6 times after which it was immediately put into the spectrophotometer (UV-1800, Shimadzu) and the absorbance was recorded as a function of time at a wavelength of 400 nm. The volume of HCl required to be added was found out from initial experiments to reach a target in the acidic range between pH 2 to 3.5.

The measured absorbance is an indicator of the turbidity (T) of the solution, according to the following relation:

$$T=H M_w C$$

The turbidity of a solution is an indicator of the molecular or aggregate size (indicated by $M_w$) and its concentration (C). The aggregation of molecules for a fixed bulk concentration leads to an increase of turbidity, which is indicated by an increase in the measured absorbance.

Method for Making Microcapsules by Double Emulsion Process

A primary emulsion of 10% Water in Oil (v/v) is first made by using the enzyme solution (Ha-lactase-5200) as water phase and soy oil+Span-80 (100 x CMC i.e. ~2% w/v) as the oil phase. The emulsion is made by vigorous mixing of the enzyme and oil solutions. At the 1 mL scale i.e. in an eppendorf, vigorous mixing is done using an eppendorf shaker at 3000 rpm for 60 s. The mixing step is repeated 5 times. Next, the double (secondary) emulsion is made by emulsifying 1% (v/v) of primary emulsion (W/O) in Water. The outer water phase comprises of 10 g $L^{-1}$ of oligo-CGMP in 100 mM sodium phosphate buffer+100 mM NaCl set at pH 7. The mixing at this step is done at mild conditions i.e. 500 rpm for 30 s (just once!). After this step, the double emulsion microcapsules have a coating of superamolecular milk proteins. The double emulsion thus obtained is then diluted ~100 x in 0.1 M sodium phosphate buffer+0.1 M NaCl and observed under the optical microscope.

CaP-oligo-CGMP based Pickering stabilized microcapsules by double emulsion process can be made by making one important change in the step of making secondary emulsion. The secondary emulsion is made using polymeric CGMP and then immediately CaP is generated in-situ as described before. This additional step was hypothesized to lead to deposition of CaP shell around the polymeric CGMP that is stabilizing the outer interface. Optical microscopy was used (as described below) to observe if the CaP particles were indeed coated at the outer interface. The control experiments, where CaP was generated in absence of the polymeric CGMP could not be performed because these double emulsions were not stable and could not be observed under optical microscope. Hence, only the 'test' experiment results are described.

Optical Microscopy

A 50 µL drop of the diluted double emulsion obtained from step-8 (above) was placed on a glass slide and covered with a thin glass cover slip. The slide was viewed under the transmittance mode in an optical microscope (Olympus BX 51) and 40× magnification (Olympus Plan CN, 40×/0.65 Ph2, Infinite/0.17/FN 22). The images were captured using a CCD camera (Olympus SC 30) attached to the microscope.

The captured image was scaled using a calibration slide and the white bar in the image corresponds to a length scale of 20 µm.

Method for Making Enzyme Loaded CaP Particles Stabilized by Oligo-CGMP and Activity Measurement Mix 0.5 mL Ha-lactase-5200 with 0.5 mL of oligo-CGMP (20 g $L^{-1}$ in 0.1 M sodium phosphate buffer+0.1 M NaCl, pH 7) by vortexing. Next, add 20 µL of $CaCl_2$ (50% w/v) and mix by vortexing. Next, add 1 mL of sodium caseinate solution (20 g $L^{-1}$ in 0.15 M $Na_2HPO_4$+50% glycerol) to the above and immediately vortex for 30 s and then leave it at rest for 15 minutes. Then, it is vortexed for 30 s and mixed gently by turning the Eppendorf upside-down at 10 rpm for 2 hours. Next, the suspension is centrifuged for 5 minutes at 3000 rpm and room temperature and the pellet is carefully separated by removing the supernatant. The pellet so obtained is next washed at least 4 times with 1.5 mL of buffer (0.1 M sodium phosphate buffer+0.1 M NaCl, pH 7). Supernatant is diluted 100× with MQ-Water and its absorbance is measured at UV 280 nm. The change in absorbance as compared to the starting enzyme solution is the amount of enzyme encapsulated in the CaP-Polymeric CGMP particles. The protein concentration is also confirmed by standard method known in the art such as BCA assay.

The mass balance is cross-checked by dissolving a set of pellet in 0.1 M HCl and then measuring the protein concentration of the clear solution. This is the direct measurement of the enzyme trapped in the CaP-Polymeric CGMP particles.

Solutions for lactase activity measurement are prepared for measurement of neutral lactase activity according to the art (neutral lactase method in FCC IV-General Tests and Assays—801-802). The rate of product formed at varying substrate concentration was then plotted as rate versus substrate concentration. The data points were fitted with Michaelis-Menten model and the best fit parameters were obtained by minimization of the sum of squared differences between data points and model calculation. The non-linear regression procedure followed in these fits is reliable ($R^2$>0.99). The kinetic parameters obtained by fitting are given in FIG. 15.

Encapsulation of Curcumin

To prepare a stock solution of curcumin, 100 mg of commercial turmeric powder was suspended in 10 mL of ethanol and vortex and kept for inversion for 2 hours. The tube was closed and covered with aluminum foil to prevent the degradation of curcumin by oxidation and UV light. Next, the suspension was centrifuged at 13200 rpm for 30 minutes to separate the insoluble particles form the ethanol solubilized curcumin. The supernatant was carefully collected and this was used as a stock solution of curcumin in ethanol. The stock solution was adjusted with ethanol so that a 100 x dilution of this stock solution in MQ-Water gave an absorbance of 2±0.1 at 420 nm, when measured immediately after the dilution. If stored at ambient conditions, the absorbance decreases rapidly due to degradation of curcumin by oxidation and light. However, when encapsulated in CaP particles stabilized by oligo-CGMP or in liposomes, the curcumin was found to be much more stable (half-life increases by 5-10 times) and hence was found to be suitable for studying the partitioning of microcapsules into model cheese curds (typical experiments are finished within two days).

To encapsulate the curcumin, 10 µL of curcumin stock solution was added to 990 µL of various concentrations of self-assembled oligo-CGMP. Encapsulation of lactase and curcumin into CaP particles stabilized by oligo-CGMP was similar to the above mentioned method of encapsulating the enzymes into these particles. To load curcumin 10 µL of curcumin stock solution was added to 990 µL of buffer (±lactase) which was used for encapsulation. The loaded curcumin was not removed by repeated washing and this indicated good encapsulation and stabilization. The microcapsule suspension with encapsulated curcumin appeared yellow.

Model Cheese Experiments

Method for Making a Model Cheese at 10 mL Scale

Add 11 g of skimmed milk powder (SMP) to 100 mL of MQ-water that also contains 100 µL of 50% w/v $CaCl_2$ (final concentration 4.5 mM) in a glass bottle to obtain a SMP concentration of 110 g $L^{-1}$. Stir mildly using a magnetic stirrer for 30 minutes (avoid excessive foaming!). Then keep the SMP dispersion at room temperature (~24° C.) for at least 30 min. (without stirring) to let it equilibrate. Pipette 10 mL of milk in the glass tubes (2.1 cm diameter and 9.5 cm length). Put the glass tubes at 32° C. for 10 minutes in a water bath that is also fitted with a mechanical device to rotate glass tubes at around 32 rpm. Next, add 100-300 µL of microcapsules (depending on the dosage required). Add 200 µL of Thermolase that had been diluted to obtain clotting in around 300-350 s. When visible clotting in the thin film of milk is observed, dotting time is recorded and glass tube is taken out and kept still at room temperature for the gel to set for a period of 3×CT. After 3×CT wait period, the gel is broken using a 1 mL pipette tip (approximately 5× linear swipes in perpendicular directions). Next, the glass tubes are transferred back to remcat bath and stirred at 32° C. for 10 minutes for the whey to phase separate out (syneresis). The phase separated curd and whey are then transferred to a 50 mL plastic tube and centrifuged at 3000 rpm for 5 minutes at 20° C. using a swinging bucket rotor. The supernatant (whey) after centrifugation is separately collected and used for further analysis. The pellet (model cheese 'curd') at the bottom of the tube is kept in the plastic tube and used for further analysis.

Preparation of Colored Microcapsules

The method followed for encapsulating lactase in CaP-oligo-CGMP-Na-Caseinate particles was similar to the earlier reported method of encapsulating the enzyme into these particles (se herein). The method for encapsulating lactase by double emulsion method has been described in details herein. Two separate approaches were used for making the colored microcapsules; 1) Blue colored capsules were made by adding 1 mg of coomassie blue (R-250) to 1 mL of the enzyme solution and then equilibrating it for 48 hours at 4° C. and then removing any insoluble particles by centrifugation at 13200 rpm for 5 minutes. The supernatant contained coomassie blue molecularly bound to the enzyme giving it an intense blue color and some free dye. The colored enzyme was then encapsulated and the microcapsules were repeatedly (6 x washing protocol) washed to remove the free (unbound) dye. This was tested in a separate experiment that when only free dye was encapsulated, most of it can be washed out after 6 washes. Hence, the final blue colored particles contained encapsulated enzyme which had coomassie blue bound to it. If the enzyme leaks out of the microcapsules then it would partition into the whey and can be detected by visual observation or by using a spectrophotometer. 2) In the case of the microparticles made by double emulsion method, 10 µL of β-carotene stock solution (30% NBC, Natural Colors, Chr. Hansen) was added to 1 mL of the oil phase and vortexed to uniformly disperse it into the oil phase. When microcapsules were made by double emulsion method (W/O/W) they were red in color due the presence of p-carotene in the oil phase.

Measurement of Enzyme Activity in Whey

The method for measuring the activity of lactase was similar to that described above and done according to the art (which was basically adapted at smaller (1 mL) scale from the standard enzymes analytical procedure—e.g. neutral lactase method in FCC IV-General Tests and Assays—801-802), with a few additional modifications as described next. The most important change for measuring the activity in whey was that the blank used in this case was whey obtained from model cheese procedure in which there was no lactase (free of encapsulated) added. This is the correct blank to be used in the assay to account for the background scattering from various whey components. This blank whey is then mixed with the substrate and treated in a manner similar to the test case. The other important point to note is that after the addition of $Na_2CO_3$ (to stop the enzymatic reaction), the samples containing particles were centrifuged at 13400 rpm for 5 minutes and then the supernatant was carefully transferred to a plastic cuvette to measure the absorbance at 420 nm.

For these experiments to measure the partitioning of lactase activity into the whey, 5.5 NLU was dosed per mL of the milk used for making model cheese. This was done by appropriately diluting the 'free' enzyme from its stock solution (Ha-lactase-5200, as formulated and sold by Chr. Hansen) so that 5.5 NLU $mL^{-1}$ can be dosed by adding 100-300 μL of the diluted solution into the milk. The microcapsules contained lactase at an encapsulation yield of 11238±3% NLU/g (dry basis), as measured at 40° C., pH 6.5 using ONPG substrate. The volume fraction of the microcapsules suspended in the buffer was adjusted to around 50 mg $mL^{-1}$ to ensure that 5.5 NLU $mL^{-1}$ can be dosed by adding 100-300 μL of these suspensions.

Example 2—Self-Assembly (Association/Aggregation) of Oligo-CGMP into 'Casein-Like' Micelles (Association Colloids) and their Use to Encapsulate Phytochemicals Such as Curcumin and P-Carotene Monomeric CCGMP (Lacprodan® CGMP-10, see FIG. 1) was cross-linked using microbial transglutaminase (mTG). CGMP monomer has three Lys and two Gln residues in its primary sequence and these are the target substrates for mTG. MTG induced crosslinking of Lys and Gln leads to the formation of oligomeric CGMP via intermolecular covalent isopeptide bonds. The term oligomer and polymer is used interchangeably herein since most of the functionalities hold true for both these.

Formation of CGMP oligomers of higher molar mass can be dearly seen in the size exclusion chromatograms (FIG. 2). It is known that the molar mass of monomeric CGMP varies between 6.7-11 kDa depending on the ratio of non-glycosylated and O-glycosylated CGMP. The column used was Superose 6 10/300 GL (GE Healthcare, Uppsala, Sweden) that had a column bed volume ~24 mL. The column exclusion limit (around the void volume i.e. ~7 mL) is reported to be ~4 MDa. This exclusion limit is based on a globular protein standard and cannot be used as such for the CGMP oligomers which most probably are random coils. Still, this chromatogram indicates that after 45 h of reaction more than 80% of the monomeric CGMP was converted in to higher molar mass oligomers. The molar mass of these oligomers seems to be between 14-4000 kDa i.e. a degree of polymerization (DP) ~2-600. The weight averaged DP seems to be 10-100. More accurate numbers on this may obtained using various analytical techniques such as mass spectrometry and light scattering. Based on the data discussed herein, it can safely be concluded that cross-linking of monomeric CGMP using mTG leads to formation of oligomeric CGMP and this can be seen from the increase in the area under the chromatograms of the molecules eluting (see FIG. 2) between void volume (7 mL) and that of the monomeric CGMP (15-17 mL). The DP is high enough to call these molecules oligomers i.e. CGMP oligomers.

The size exclusion chromatogram of the native i.e. unmodified CGMP (FIG. 2) indicates that it is mainly composed of CGMP and there are minor amounts of other proteins appearing as a shoulder. The elution volume of the shoulder is similar to whey proteins β-lactoglobulin. There is also a minor amount of larger size protein eluting at lower elution times than CGMP. This could be the more glycosylated fraction of the CGMP eluting earlier due to higher hydrodynamic size due to glycosylation. The elution volume of the major peak of the monomeric CGMP is higher than β-lactoglobulin. This does not mean that the molar mass of CGMP is higher than β-lactoglobulin. In literature, often, lower elution volumes of CGMP have been interpreted as oligomeric CGMP, but this is not conclusive. The lower elution volume of CGMP of molar mass around 6.7 kDa as compared to that of β-lactoglobulin of molar mass 18.2 kDa is due to their different conformations in the solution. The β-lactoglobulin exists as a globule in the solution while CGMP is an unordered (random coil) peptide. The radius of gyration and hence the hydrodynamic radius of a random coil protein or peptide of low molar mass can still be higher than that of a globular protein of larger molar mass. We speculate that the lower elution volumes are due to random coil nature of the monomeric CGMP in solution.

After cross-linking with mTG, the monomeric CGMP peak decreased significantly (FIG. 2) and simultaneously there was an increase of the peak areas at lower elution volumes than monomeric CGMP (FIG. 2). From this we conclude that oligomers and polymers are being formed after the mTG induced cross-linking. Intermolecular cross-linking results in the formation of oligomeric/polymeric-CGMP and that elutes at lower elution times than that of monomeric CGMP.

The samples collected at various time points were also analyzed by DLS (FIG. 3) and these results indicate that oligomers were of hydrodynamic size increasing from around 3 nm at early period of cross-linking to around 10 nm after 4 hours of crosslinking (which is five times more than that of monomeric CGMP with a hydrodynamic size around 2 nm). At longer reaction times, polymers of the size range 20-200 nm are formed.

The sample collected after 32 hours of reaction was adjusted to various concentrations and the hydrodynamic size as a function of the bulk concentration of oligo-CGMP is shown in FIG. 4. It was found that oligo-CGMP self-assembled (aggregated) into larger 'casein-like' micelles beyond a critical concentration of around 20 g $L^{-1}$. The size of these association colloids was found to be in the range 100-500 nm (FIG. 4), whereas monomeric CGMP did not show this property and its size remains same at various concentrations.

The self-assembled oligo-CGMP 'casein-like' micelles were found to effectively encapsulate curcumin and p-carotene (FIG. 5). The stability as indicated by half and quarter-life of the curcumin significantly increased when it was encapsulated in oligo-CGMP micelles. The enhanced stability region correlated very well with the critical concentration above which oligo-CGMP was found to self-assemble.

Example 3—Use of the Oligo-CGMP for Making Stable Acidic CGMP Based Clear Beverages which is not Possible with the Monomeric Form There are many foods where the pH is acidic i.e. pH<4. At acidic pH, monomeric CGMP is known to self-assemble. The aggregation resulting from self-assembly at low pH leads to formation of visible aggregates and eventually to phase separation. This is not desired in many acidic protein based beverages.

To ensure that the aggregation experiments performed at low pH are not misleading due to turbidity contribution from the larger size (molar mass) of the polymeric CGMP, the turbidity of the monomeric and polymeric CGMP at varying bulk concentration was measured at pH 7. As expected, the turbidity increases with increasing concentration and the increase is more for the case of polymeric CGMP than that of monomeric CGMP. The highest absorbance recorded for polymeric CGMP is <0.04 for 10 g $L^{-1}$ bulk concentration. Since, at pH 7 both monomeric and polymeric CGMP are net negatively charged, they do not aggregate. Hence, for a clear conclusion on aggregation at low pH, the absorbance must be >>0.04. Hence, in the case of aggregation studies at pH<4, if the absorbance increases above 0.05, then the system was considered to be aggregating and if increases beyond 1 i.e. when the solution becomes turbid, the solution can be considered unstable. For a colloidally stable opalescent solution turbidity will be less than 0.5 e.g. as expected for a concentrated solution of self-assembled oligo-CGMP colloidal micelles.

From FIG. 6 it is very clear that the polymeric CGMP does not seem to be aggregating even at long storage times. On the other hand, monomeric CGMP starts to aggregate and the aggregation increases with time indicated by significant increase in absorbance with storage time. Hence, it can be concluded that polymeric CGMP is colloidally stable at a wide range of pH.

Monomeric CGMP is used for making acidic protein based beverages for patients suffering from PKU related problems. Monomeric CGMP is also present in acidic whey based beverages since it is one of the components in whey powder. However, the stability of CGMP in acidic beverages is not very good as it is known to aggregate at low pH which leads to turbidity build-up in these beverages. Polymeric CGMP could be a very good alternative for such applications since it does not aggregate at low pH. The difference between the aggregation behavior of these two molecules can clearly be seen from FIG. 6. For similar time scales of storage at pH<4, polymeric CGMP is not aggregating.

Crosslinking of CGMP prevents it from aggregation and renders it stable at acidic pH as opposed to its monomeric form. This could be very useful for acidic protein based beverages. Many protein supplemented acid beverages for people suffering from PKU are based on monomeric CGMP. Acidic dairy (milk) protein based beverages in general have some stability issues and often precipitation of proteins is the main cause. A present method to resolve this issue is to use polysaccharides such as pectin to impart stability. We expect that polymeric CGMP can potentially provide a similar colloidal stability at low pH. Hence, beverages based entirely on ingredients derived from milk can be made. This can be advantageous for product (clean) labelling. Use of polymeric CGMP for these beverages can be expected to lead to enhanced stability.

Example 4—Colloidal Stabilization of Calcium-Salt Based Precipitated Particles with Oligo-CGMP and its Use for Calcium Fortification With oligomeric/polymeric CGMP it was observed that polymeric CGMP seems to be delaying the precipitation kinetics of calcium phosphate (CaP). So, the next question is if this enhanced colloidal stability can be used for also stabilizing particle suspensions. Calcium phosphate (CaP) is a natural choice for such a study on colloidal stabilization of inorganic particle suspensions. In milk, CaP nanoparticles are strongly interacting with serine bound phosphate groups. This is believed to lead to their stabilization against complete phase separation. Monomeric CGMP has phosphorylation at serine resulting from a post-translational modification. Hence, it was hypothesized that polymeric CGMP might be binding very well to CaP nano-clusters and imparting them colloidal stability.

CaP was formed by precipitation reaction of $CaCl_2$ and Na-phosphate in the presence of the monomeric or polymeric CGMP while maintaining other conditions same (FIGS. 7 and 8). These two figures indicate the formation of CaP from two different concentrations of $Ca^{2+}$ ions i.e. 10 mM (FIG. 7) and 100 mM (FIG. 8). It can be seen from these figures that in absence of CGMP, the speed of CaP formation is very high and the CaP particles much larger than 1 μm (as judged by bulk phase separation) are formed within two minutes. This rate is not altered by a globular protein e.g. lactase (indicated by abbreviation 'La' in the figures). However, the rate of formation of CaP is slowed down in presence of monomeric CGMP. This indicates that CGMP is interacting with CaP particles and rendering some stability to them. Still, visibly large aggregates are obtained. However, the rate of formation of CaP is much more slowed down in the presence of polymeric CGMP. This indicates that polymeric CGMP is providing much more colloidal stability than its monomeric form.

Monomeric CGMP has phosphorylation at serine (post-translational modification). CGMP is obtained from κ-casein, which is not known to be sensitive to the presence of calcium ions. However, polymeric CGMP has more phospho-serines per molecule and could potentially bind to inorganic calcium phosphates (CaP) in a way similar to binding of other caseins to CaP clusters in a casein micelle. Hence, by careful selection of the precipitation conditions, the formation of CaP particles can be controlled by using polymeric CGMP. This combination of polymeric CGMP and CaP could have many different techno-functional and bio-functional applications in e.g. food industry.

CGMP polymers are effective modifiers of calcium phosphate (CaP) precipitation kinetics. They slow down the precipitation much more effectively compared to its monomeric form. Hence, CGMP polymers can be used to make amorphous calcium phosphate (nano) particles. These bio-composite CGMP-CaP particles can be used for various purposes, e.g. encapsulation of food (dairy) enzymes.

The bio-composite made from polymeric CGMP and CaP can also be used as a coating material for the soft microcapsules made by (double) emulsion method. Using this method almost anything can be encapsulated for food applications such as probiotic bacteria, flavors/aroma, phytonutrients and colors. These bio-composite coatings are expected to lead to stronger and more protected microcapsules. Controlled biomineralization for such coating applications is a major challenge at the moment. Controlled precipitation of CaP in presence of polymeric CGMP leads to formation of biocomposite aggregates similar to the casein micelle. Since, casein micelle has been proposed as delivery vehicle for various food and bio-medical applications, these aggregates can also be seen as mimics of casein micelle containing inorganic calcium. For example, baby formula milk which aims to deliver sialic acid through CGMP can alternatively be formulated with polymeric CGMP-CaP combination with added advantage of encapsulating sensitive molecules such as vitamins. CGMP polymers are effective modifiers of calcium phosphate (CaP) precipitation kinetics. They slow down the precipitation much more effectively compared to its monomeric form. Hence, CGMP polymers can be used to make amorphous calcium phosphate (nano) particles of any desired size. These stable colloidal dispersions of CaP can then be used in calcium fortified dairy beverages.

The turbidity experiments were repeated using DLS. The aim was to compare the calcium phosphate (CaP) precipitation kinetics in presence of the monomeric (native) CGMP and the oligomeric CGMP under similar solution conditions of protein concentrations, pH, $Ca^{2+}$ concentrations etc. and measure the hydrodynamic size of the CaP particles formed in each case by dynamic light scattering. The results are described below and the mechanism is discussed in details.

Precipitation occurs when the product of ionic concentrations are $>K_{sp}$ for a sparingly soluble salt. The $K_{sp}$ for CaP $(Ca_3(PO_4)_2)$ is $=2.07 \times 10^{-33}$ at 25° C. The solubility product indicates the low solubility of a sparingly soluble compound such as CaP. Ignoring the valency of the dissociated ion, for simplicity, only the stoichiometry is considered, hence for $Ca_xP_y$ the solubility product is $K_{sp}=[Ca]^x \cdot [P]^y$ (unit=$M^{x+y}$). Due to low solubility, the ionic activities are approximated by their molar concentrations. Further, $pK_{sp}$ can easily be obtained as $-\log K_{sp}$. The $pK_{sp}$ values are positive. A large positive value means a very low solubility of the salt. For CaP $(Ca_3(PO_4)_2)$ the $pK_{sp}$ can be calculated to be 32.68, which indicates very low solubility as compared to calcium hydroxide ($pK_{sp}=5.3$) or calcium carbonate ($pK_{sp}=8.47$). The concentrations used in our experiments indicate that CaP will readily precipitate at room temperature. This however, does not tell anything about the speed (rate) at which the particles will grow and the final size/shape/morphology they will attain.

When $CaCl_2$ is mixed rapidly with $Na_2HPO_4$, CaP is instantaneously precipitated out if there is no crystal growth inhibitor (stabilizer). This, for example, happens in the case of control experiment i.e. when only CaP is formed. The CaP particles rapidly (within few minutes) grow to a size larger than 1 μm and they start sedimenting under the influence of gravitational force. Clearly, the surface charge (potential) is not high enough to prevent particle growth to such large dimensions. In the presence of a suitable stabilizer (steric or charged) the particle growth can be stopped and particles of much smaller dimension (<1000 nm) can be obtained. Hence, monomeric CGMP and oligomeric CGMP were tried as stabilizers and the stabilization and particle size control ability for CaP is described below.

FIG. 9 indicates that monomeric CGMP is not a very effective stabilizer (particle growth inhibitor) for CaP particles. Large particles (>1000 nm) are formed within around 10 minutes for the concentration of $Ca^{2+}$ ions varying from 10 mM to 100 mM. Comparing the case of control with that of monomeric CGMP it can be concluded that-the speed of CaP formation is very high and the CaP particles much larger than 1 μm (as judged by bulk phase separation) are formed within five minutes. However, the rate of formation of CaP is slowed down in presence of monomeric CGMP and it takes at least 10 minutes for the particles to become larger than 1000 nm. This indicates that CGMP is interacting with CaP particles and rendering some stability to them. Still, large (>1000 nm) aggregates are obtained.

As compared to the above two cases, the rate of formation of CaP particles is much more slowed down and reduced i.e. smaller size in the presence of oligomeric CGMP (FIG. 10). This indicates that oligomeric CGMP is providing much more colloidal stability than its monomeric form. Monomeric CGMP has phosphorylation at serine (posttranslational modification). CGMP is obtained from κ-casein and its solubility is not known to sensitive to the presence of calcium ions. However, oligomeric CGMP has more phospho-serines per molecule and could potentially bind to inorganic calcium phosphates (CaP) in a way similar to binding of other caseins to CaP clusters in a casein micelle.

Further, there seem to be two stages in the formation of CaP nanoparticles stabilized by oligo-CGMP. Initially (<10 minutes) nanoparticles of $R_h$ varying between 60-80 nm are formed. In the next stage (>10 minutes) these particles ripen to a slightly larger size of $R_h$ around 90-110 nm (FIG. 10). In addition, the nanoparticles stabilized by oligo-CGMP are highly mono-disperse (FIGS. 11 and 12). The intensity based size distributions (FIG. 11) appear to be more mono-disperse since the scattering is dominated by larger particles (from the ripened second stage!). More realistically, the ripening is expected to be continuous process and hence the particles distribution measured at a given stage must comprise particles from both the initial and ripened stage. This can be seen more clearly from the volume based distributions (FIG. 12) where a shoulder appears in the sizes measured during the first stage (t0 for varying calcium concentration in FIG. 12). Despite these nanoscopic variations during the initial stage, the particles after ripening are mono-disperse, the average hydrodynamic radius being around 100 nm (FIG. 10-12).

Finally, it was tested if the plateau hydrodynamic radius (after the second stage or ripening) can be controlled by varying the ratio of CaP to the oligo-CGMP concentration. As can be seen from FIG. 13, the final plateau size increases with decreasing amounts of the oligo-CGMP. This clearly demonstrates that oligo-CGMP are acting as colloidal stabilizers and the mode of action can be speculated to be a combination of electrostatic repulsion and steric repulsion originating from a combination of charged backbone and larger molar mass of oligo-CGMP. Hence, by careful selection of the precipitation conditions, the formation of CaP particles can be controlled by using oligo-CGMP. This combination of oligomeric/polymeric CGMP and CaP could have many different techno-functional and bio-functional applications in food and pharmaceutical industry.

CGMP oligomers (polymers) made by cross-linking CGMP with mTG, are effective modifiers of calcium phosphate (CaP) precipitation kinetics and particle growth. They slow down the particle growth rate much more effectively compared to its monomeric form. Hence, oligo-CGMP can be used to make amorphous calcium phosphate (nano) particles. These bio-composite oligo-CGMP-CaP particles can be used for various purposes, e.g. encapsulation of food (dairy) enzymes. Moreover, the results described above also point to a more fundamental principle of colloidal stability of CaP in presence of the adsorbed phosphoproteins. In addition, the ratio of oligo-CGMP to CaP seems to be a very good parameter to control the particle size. Remarkably, there appear to be two distinct regions, which can be designated as a kind of state diagram for the two interacting phases comprising CaP and oligo-CGMP. The CaP particle size is stabilized at a hydrodynamic radius around 100 nm beyond the oligo-CGMP concentration of around 10 g $L^{-1}$. This critical concentration seems to be around the critical aggregation concentration of oligo-CGMP. Hence, a remarkable colloidal stability could also originate from the adsorbed self-assembled layers of oligo-CGMP which leads to a thicker coating around the CaP nanoparticles.

Example 5—Colloidal Stabilization of Calcium-Salt Based Precipitated Particles with Oligo-CGMP and its Use for Encapsulation (e.g. Controlled Delivery and Release of Dairy Enzymes into Cheese Matrix)

One potential use of the bio-composites based on oligomeric CGMP and CaP is for encapsulating enzymes for food applications. This is demonstrated by encapsulation of Ha-lactase in amorphous CaP particles stabilized by oligomeric CGMP. As it can be seen from FIGS. 14 and 15, lactase was successfully encapsulated in these particles. These bio-composite particles of CaP and oligomeric CGMP have a huge potential for the purpose of encapsulation. They can be used as such or as a coating material for the soft microcapsules made by double emulsion method.

To test the idea of the potential use of the bio-composites based on polymeric CGMP and CaP for encapsulating food enzymes, lactase loaded CaP-polymeric CGMP particles were prepared. The idea was tested by activity measurement of the free enzyme and the enzyme encapsulated in amorphous CaP particles stabilized by polymeric CGMP.

The lower $k_{cat}$ (FIG. 15) and slower rate of product formation (FIGS. 14 and 15) in the case of encapsulated enzyme indicates that enzyme was successfully encapsulated in the pores of the micro particles and there was a significant resistance to mass transfer of substrate into the particles and transport of products out of the particles. The decrease in overall rate is due to diffusional resistance to mass transfer of the substrate in to the particles and transport of the product out of the particle matrix. A part of the activity loss could be due to direct interaction of the enzyme with CaP surface which might lead to partial denaturation of the enzyme e.g. due to some degree of change in the tertiary structure.

Enzymatic cross-linking of casein glycomacropeptide (CGMP) using microbial transglutaminase leads to formation of CGMP polymers. These CGMP polymers have been found to have different physico-chemical properties than its monomeric molecule and these differences lead to improvement in functionalities. In addition, polymeric CGMP can also be used for making stable double emulsions of W/O/W type where the outer phase has been stabilized by the polymeric CGMP (FIG. 16). The initial 'proof of concept' experiments to make W/O/W double emulsions by using polymeric CGMP are very promising and even is the use of bio-composite polymeric CGMP-CaP particles for making the double emulsion and hence use this approach for encapsulation of food (dairy) enzymes. The bio-composite made from polymeric CGMP and CaP can also be used as a coating material for the soft microcapsules made by (double) emulsion method. Using this method almost anything can be encapsulated for food applications such as probiotic bacteria, flavors/aroma, phytonutrients and colors. These biocomposite coatings are hypothesized to lead to stronger and more protected microcapsules. These initial proof of concept experiments are first step towards this goal.

Potential use of oligomeric CGMP-CaP complex as food grade Ramsden-Pickering stabilizer (commonly known as 'Pickering' stabilization) is evident from FIG. 16. The double emulsion drops stabilized only by oligomeric CGMP are spherical in shape ('Laplacian' curvature) but the drops stabilized by combination of oligomeric CGMP and CaP are non-spherical. This non-spherical shape is indication of a very rigid membrane or layer at the outer drop surface. This kind of non-Laplacian shape has been reported in literature for Pickering stabilized drops using other types of inorganic particles. When it comes to food systems, there are not many options for food grade Pickering stabilizers. Hence, oligomeric CGMP-CaP could be very advantageous specially from labelling point of view.

Combination of polymerized CGMP and CaP can be used for Pickering stabilization of emulsions. CaP by itself is does not lead to Pickering effect but the Pickering effect is observed when it is complexed with CGMP polymers. This combination of polymeric CGMP and CaP, being food grade can be used for making Pickering stabilized food emulsions. For example, the bio-composite made from polymeric CGMP and CaP can also be used as a coating material for the soft microcapsules made by (double) emulsion method. Using this method almost anything can be encapsulated for food applications such as probiotic bacteria, flavors/aroma, phytonutrients and colors. These biocomposite coatings are expected to lead to stronger and more protected microcapsules. Controlled bio-mineralization for such coating applications is a major challenge at the moment.

Controlled Delivery and Activity of Encapsulated Enzymes in the Cheese Matrix

The curd obtained at the end of the method of preparing model cheeses as described in Example 1 above are shown in FIG. 17. These four separate model cheeses were prepared with and without (control) red and blue microcapsules. The curds in the case of colored microcapsules were found to be uniformly colored as compared to the control cheese which appears white (FIG. 17). Hence, the protocol for stirring/mixing etc. was good enough to keep the microcapsules suspended uniformly during the dotting stage. The consistency of the model cheese curd indicates that most of the essential steps of large scale cheese making e.g. pressing of curd to drain the whey etc. could be mimicked very well by the centrifugation protocol described above. Additionally, the whey in all the cases was found to be visibly clear of any color (FIG. 18). This indicates that the microcapsules had preferentially partitioned into the cheese curd.

In addition to the visual observation, the enzyme activity was also measured in the whey to compare free versus encapsulated enzyme. The results are shown in FIG. 19. The free enzyme was found to significantly partition into whey where an activity of ~40% of the total amount dosed was measured. In the case of encapsulated enzyme, only an activity of <4% was measured in the whey, indicating that encapsulation was effective in preventing the partitioning of enzyme into the whey.

The experiments with colored microcapsules and the activity measured in the whey seem to prove our concept very well i.e. encapsulation seems to be a very good strategy to partition soluble enzymes into the cheese curd.

In summary, lactase was found to be effectively encapsulated by both the methods of encapsulation. This had already been showed herein but the above experiments provide additional support to the existing data. The colored microcapsules were found to effectively (preferentially) go into the model cheese curd. No colored microparticles were detected in the model whey separated from the model cheese. This compliments the observation that model cheese curd was found to be uniformly colored. These observations indicate that microcapsule particles are indeed getting trapped in the casein network formed after dotting. The observations with color corresponded very well with the enzyme activity measurement i.e. free enzyme was found to significantly partition into whey (~40%) while an activity of <4% was measured in the case of encapsulated enzyme, indicating dearly that most of the activity must have been retained in the curd (similar to the color!).

Hence, it is hypothesized that the microparticles containing encapsulated lactase were large enough to be partitioning preferentially into cheese curd. The mechanism (mode of action) of partitioning of these microcapsules (particles) into model cheese curd must be similar to the 'entrapment/sieving' mechanism for milk fat particles into cheese curd, which is mainly due to their larger (>1 μm) size.

The activity of the enzyme partitioned into cheese matrix can be increased by coating the microcapsules with suitable coatings of a well-defined thickness as shown in FIG. 20. FIG. 20 indicates that enzyme is active in cheese curd and thicker coating protects enzyme from leaking into the whey. In conclusion, microencapsulation seems to significantly prevent partitioning of enzymes into the whey and is a very effective strategy to partition enzymes into cheese curd matrix. Currently used encapsulation methods for cheese applications are not suitable for food use and hence, the method described here with the use of dairy based ingredients is novel.

Example 6—"Immobilzation of a Basic Protein (Enzyme)"

Materials and Methods

Encapsulation of lactose oxidase (LOX, LactoYield®, Chr. Hansen A/S) following the method described in example 1 resulted in an encapsulated activity yield of around 10 LOX U/g. The activity of lactose oxidase was measured using the method used for measuring activity of cellobiose dehydrogenase with some modifications. The activity assay was based on reduction of 2,6-dichlorophenolindophenol (DCPIP) by LOX and the kinetics were followed by measuring absorbance at 500 nm, 37° C., pH 6.5 (0.1 M sodium phosphate buffer). Enzyme activity (LOX U/g) was obtained from a calibration curve of speed of DCPIP conversion versus the dilutions of standard LOX stock solution supplied by Chr. Hansen A/S with reported activity of 15 LOX U/g. From the electrostatic charge considerations, it was hypothesized that immobilization of LOX on the inorganic-organic matrix particles stabilized by oligo-CGMP would lead to higher activity yield of LOX. Our idea was that a basic (isoelectric point, pI>7) protein or enzyme such as LOX can be immobilized on the negatively charged microparticles by electrostatic mechanism (ion-exchange). The theoretically expected net negative charge (at 3.5<pH≤7) on oligo-CGMP was also experimentally ascertained by measuring the electrophoretic mobility of monomeric CGMP and oligo-CGMP in the pH range 2-7. Electrophoretic mobility was measured using the nano-zetasizer (Nano-ZS, Malvern, details described in example 1—DLS measurement) in a folded capillary cell (Malvern). The samples were extensively dialyzed against MQ-water using dialysis tubes of 6-8 kDa molecular weight cut-off (Pur-A-Lyzer Maxi 6000, Sigma-Aldrich) at 4° C. The dialyzed monomeric CGMP and oligo-CGMP was further diluted with Milli-Q water to 1 g/L and the pH was adjusted using 0.1 M HCl or NaOH. Three measurements were done for each of the duplicate samples and the results are reported as the average±standard deviation of these measurements.

The materials and methods used for immobilization are described next. For the immobilization experiment, a commercially available microbial transglutaminase (mTG, 1000 U/g, Ajinomoto) was used for making cross-linked (oligomerized/polymerized) CGMP (oligo-CGMP/poly-CGMP) and casein (poly-Cas). Sodium caseinate (Cas), disodium hydrogen phosphate ($Na_2HPO_4$), sodium dihydrogen phosphate ($NaH_2PO_4$), sodium carbonate ($Na_2CO_3$) and calcium chloride ($CaCl_2$) were of analytical grade. Dialysis tube was from Spectra Por (MWCO 12-14 kDa, Standard RC tubing, diameter 29 mm). The filter Paper was from Whatman (Diameter 320 mm, Whatman 114 V Filter Paper Cone, wet strengthened, GE Healthcare Life Sciences). MQ-water was used for preparing all the solutions and also for dialysis of LOX and washing of the microparticles before and after immobilization.

For making polymerized CGMP (poly-CGMP), 120 g/L CGMP was suspended in sodium phosphate buffer (0.2 M, pH 7). Then the weighed quantity of CGMP powder was added in half the volume of final solution volume required. The suspension was stirred overnight at 4° C. and next day buffer was added to make the suspension volume up to 95% of the final volume and stirred for 15 minutes at room temperature. Then the suspension was incubated at 40° C. for 1 hour. Next, the mTG powder was suspended in sodium phosphate buffer (0.2 M, pH7). The volume of buffer used was 5% of the total volume required for the cross-linking reaction and the amount of mTG powder used was to achieve a dosage of 2 U/mL of reaction volume after enzyme solution was mixed with the CGMP solution. The mTG powder was dissolved by gently stirring or turning and then incubated at 40° C. for 15 minutes. The mTG solution was added to the CGMP solution with gentle stirring and then the reaction mixture was incubated at 40° C. for 30 hours. After 30 hours of cross-linking reaction, the mTG was inactivated by keeping the solution at 90° C. for 10 minutes and followed by cooling down to room temperature. Finally, 0.5% (w/v) preservative (sodium benzoate) was added and the solution was stored at 4° C. The polymerized casein (poly-Cas) was made by following the same method as used for poly-CGMP. The only change being the concentration of sodium caseinate, i.e. 30 g/L of sodium caseinate was used.

Following salt solutions were also made; 4.5 M $CaCl_2$, 0.52 M $Na_2HPO_4$ and 0.75 M $Na_2CO_3$. For dialyzing the LOX stock solution, 100 mL of LOX stock solution was filled in the dialysis tube of approx. 40 cm length and then this tube was kept in 5 L of MQ-water at 4° C. with slow stirring for 4 hours. Next, the outer MQ-water was replaced and dialysis was continued for another 20 hours. At the end of dialysis, the volume of the dialyzed LOX was measured to correct the concentration reduction due to increase in volume after equilibrium dialysis.

The poly-CGMP stock solution (120 g/L) was diluted to a concentration of 20 g/L using 0.52 M $Na_2HPO_4$. The poly-Cas stock solution (30 g/L) was diluted to a concentration of 10 g/L using 0.75 M $Na_2CO_3$. Next, 100 mL of $CaCl_2$ (4.5 M) was added to 450 mL of poly-CGMP solution (20 g/L). The addition of $CaCl_2$ was done over a period of 10 minutes while the suspension was being stirred. Then 450 mL of poly-Cas (10 g/L) was added to the above suspension. The addition was done over a period of 10 minutes while the suspension was being stirred. The suspension was stirred for 2 hours at room temperature and then filtered over a filter paper and washed with 2× volume of MQ-water (i.e. using 2 L of MQ-water for 1 L of original suspension volume). The washed wet cake of microparticles was weighed and then suspended in equal weight of the dialyzed LOX solution. The suspension was kept stirring at 4° C. for 12 hours. After equilibrium ion-exchange, the suspension was filtered under gravity using a filter paper in the cone to separate the mother liquor (containing residual/free LOX). The cake retained on the filter paper was then washed with 2 L of MQ-water (i.e. 4 washes using 500 mL MQ-water per wash). The washed cake of immobilized LOX was then formulated as liquid suspension and a dried powder. For obtaining a dried powder, the washed cake was spread over a petri dish and then kept in fume hood at room temperature for drying. The dried flakes were grounded using a mortar and pestle to obtain a fine powder. For liquid suspension, the washed cake was suspended in equal weight of 99% glycerol and stored at 4° C.

The activity of the immobilized LOX was measured by the method described above, which is based on reduction of DCPIP. The activity of the dry powder (immobilized LOX) was found to be 29 LOX U/g.

Immobilized LOX powder (29 LOX U/g) was suspended at a concentration of 10 mg/mL in 1 mL of these solutions: MQ-water, sodium phosphate (NaP) buffer, pH 7 (strength=10, 25, 50, 75, 100, 150, 200 mM) and 200 mM NaP buffer, pH 7+0.1 M EDTA. The eppendorf tubes were then incubated at 40° C. and 1000 rpm for 1 hour. After the end of incubation, the suspensions were centrifuged at 13400 rpm for 5 minutes and 50 µL of the supernatant was carefully transferred to another eppendorf tube. Then, 50 µL of the supernatant was mixed with 50 µL of SDS-PAGE sample buffer (2× Laemmli sample buffer, Bio-Rad) in which 0.1 M of DTT was also added. The above mixture was then heated at 90° C. for 10 minutes and cooled down to room temperature with vortex mixing. Next, 20 µL of the above mixture was loaded in the stain free gels (MiniProtean TGX stain free precast gels, Any kD, Bio-Rad) and the gel was then immersed in the TGS running buffer (25 mM Tris-192 mM Glycine-0.1% w/v SDS, pH 8.3). Electrophoresis was done at 300 V for 18 minutes and then the gel was imaged using Gel Doc EZ Imager (Bio-Rad). The relative molar mass of the separated bands was estimated by comparing them to a molar mass standard in the first lane (Precision Plus Protein Standard, Unstained, Bio-Rad). The amount of the LOX in each sample lane was quantified by image analysis using Image Lab 5.1 (Bio-Rad). The area under the curve of the intensity vs migration distance corresponding to LOX was used as the quantity of LOX in that sample. The quantity of LOX estimated from SDS-PAGE for each ionic strength was normalized by the quantity of LOX found in the sample fully dissociated in 0.1 M EDTA added to 0.2 M phosphate buffer. The ionic strength was calculated from the molar amounts of mono sodium and disodium phosphate used for each sample (assuming full dissociation) using the equation: $I=0.5 \Sigma_i(c_i z_i^2)$, where, I is the ionic strength (mM), c is the molar concentration and z is the valency of each ionic species (i) present in the buffer.

Model cheese was made by following the method described in example 1. To mimic the acidification by starter cultures, 100 mg of gluconic acid δ-lactone (GDL) was added to 10 mL of milk and then the tubes were further incubated for 10 minutes. This results into an initial GDL concentration of around 56 mM in milk. The samples for quantifying the initial amount of free LOX ($F_0$) was prepared by diluting the 50 µL of LOX stock (15 LOX U/g) in 10 mL of MQ-water instead of milk. The sample indicating the initial total amount of immobilized LOX ($I_0$) was prepared by dissolving 35 mg of immobilized LOX powder (29 LOX U/g) in 10 mL of 200 mM NaP buffer, pH7+0.1 M EDTA. Similarly, 50 µL of free LOX and 35 mg of immobilized LOX powder was added in 10 mL of model milk labelled as blank (B), free LOX (F), free LOX with GDL (F+GDL). In the case of immobilized LOX, clotting enzyme was added after 10 minutes of acidification ($I_{10}$+GDL) or after 10 minutes incubation without GDL ($I_{10}$). Similarly, $I_{60}$ and $I_{60}$+GDL are the samples after 60 minutes of incubation at 32° C. To start the clotting of milk, 200 µL of 3.125 IMCU/mL of dotting enzyme (Thermolase, 625 IMCU/mL, Chr. Hansen A/S) was added to 10 mL of model milk incubated at 32° C. The samples after dotting were treated and processed as described in example 1. The whey samples were analyzed and quantified for LOX by SDS-PAGE method following the same sample preparation and analysis procedure as described above for the immobilized LOX stability experiments at various ionic strengths. The quantity of LOX partitioned into whey was obtained by normalizing the 'blank corrected' area corresponding to LOX by the total LOX area in the samples $F_0$ and $I_0$. This ratio indicates the part of LOX that has partitioned into whey out of the total LOX dosed initially into the milk.

Results and Conclusion

Oligo-CGMP is more negatively charged than the monomeric CGMP in the pH range of pI-7 (FIG. 22). The pI of monomeric protein was found to be around 3.3 while it decreased after cross-linking in the case of oligo-CGMP to 2.5. This decrease in pI is due to cross-linking of the Lys residues (FIG. 1) and hence the net negative charge increases for oligo-CGMP as compared to the monomeric CGMP. This negative charge is responsible for the electrostatic complex formation with LOX and hence is the mechanism behind the immobilization by ion-exchange. The activity of the dry powder (immobilized LOX) was found to be 29 LOX U/g.

Immobilized LOX was found to be stable when kept suspended in 50% glycerol or in the dry powdered form and no enzyme was found to be released even after two months of storage. Typical ionic strength of the bovine milk is around 80 mM and hence it was decided to suspend the immobilized LOX particles in buffer of various ionic strengths and quantify the amount of the LOX released form the particles (FIG. 23 a and b).

The immobilized LOX was found to be released form the microparticles as a function of increasing ionic strength. At the ionic strength comparable to milk i.e. around 80 mM, less than 10% of the immobilized enzyme is released. Even at a high ionic strength of around 460 mM, more than 70% of the LOX remained immobilized on the particles. Hence, it can be inferred that the LOX is held on to the particles by strong interactions. Dissolution of the inorganic (CaP/CaC) matrix in 0.1 M EDTA led to complete partitioning of the LOX into supernatant solution phase. This result indicated that most of the immobilized LOX would remain adsorbed onto the particles in milk and hence would partition into the cheese curd.

When the LOX is not immobilized i.e. when it is free, more than 85% of the enzyme is lost in whey (FIG. 24). However, after immobilization it was found that more than 90% of the immobilized enzyme partitions into cheese curd and the amount lost in whey is less than 5%. Hence, by immobilization most of the LOX can be delivered into the cheese curd and the losses in the whey can be minimized significantly. Acidification down to pH 5.4 (60 minutes after addition of 10 g/L GDL) does not change this conclusion.

In summary, food grade particles based on dairy ingredients such as oligo-CGMP can be used for immobilization of LOX. The current method results in an activity of around 30 LOX U/g of the dried powder. Even higher activity/g of the microparticles can be achieved by varying the ratio of organic and inorganic phases to have more proteins fraction. The immobilized LOX is released form the particles as a function of increasing ionic strength. At the ionic strength comparable to milk i.e. around 80 mM, less than 10% of the immobilized enzyme is released. Model cheese experiments with immobilized LOX indicate that >90% of the immobilized enzyme partitions into cheese curd and the amount lost in whey is less than 5%. In the case of free LOX more than 85% of the enzyme is lost in whey. Hence, by immobilization most of the LOX can be delivered into the cheese curd and the losses in the whey can be significantly minimized. It is evident to those skilled in art that the above described method of immobilization would also work for other basic proteins or peptides such as lysozyme, lactoferrin, polylysine, lactoperoxidase, nisin etc.

In conclusion, oligomeric CGMP grafted (adsorbed) onto CaP (CaC) nano/microparticles, with or without additional coating from other polymerized milk (food) proteins can be used for immobilization of basic enzymes (proteins/peptides). The immobilization using the method described above leads to larger activity yields and hence can be used for immobilizing relatively large amounts of enzymes (e.g. LOX).

Example 7—"Gelation"

Method

Gelation of oligo-CGMP at neutral pH and room temperature was induced by mTG. The method for making the oligo-CGMP was same as described in example 6 but with an additional purification step for the monomeric CGMP. The commercial powder contained other whey proteins mixed with CGMP. Hence, after dissolution of 120 g/L of this powder, the whey proteins were reduced, heat denatured and aggregated by heating at 90° C. for 30 minutes followed by ultra-centrifugation to remove the insoluble/aggregated whey proteins. This resulted in a clear and almost pure solution of CGMP. The concentration of purified monomeric CGMP was adjusted to 60 g/L and then it was cross-linked using mTG as described in example 6. After cross-linking a clear solution of 60 g/L oligo-CGMP was obtained. This clear solution of 60 g/L oligo-CGMP dissolved in 0.2 M sodium phosphate buffer (pH 7) was then used as a starting ingredient to be further polymerized and gelled by mTG. Oligo-CGMP solution was mixed with mTG dissolved in the same buffer in a volume ratio of 95:5 v/v such that the final concentration of the added mTG was 2 U/mL of the oligo-CGMP solution. A control experiment was performed with buffer without the enzyme. The control and test samples were then kept at room temperature (24+2° C.) for 24 hours. The glass vials were inverted after 24 h to distinguish the gelled sample. A red laser beam was passed through the transparent samples to observe the scattering from the gel phase.

The 'cold' gelation of oligo-CGMP was used for microencapsulation of bacteria. Bacteria was microencapsulated in the 'gelled' inner water phase ($W_1$) emulsified in oil phase (O) which contained polyglycerol polyricinoleate i.e. PGPR (PGPR-4125, Palsgaard). The $W_1$/O emulsion was again emulsified in outer water phase ($W_2$). This process of encapsulation by double emulsification is essentially similar to that described in example 1 and results in a $W_1$/O/$W_2$ double emulsion. The $W_1$ phase contained 200 g/L bacteria mixed with cryo-protectants (FLORA C160, Chr. Hansen A/S) dispersed in oligo-CGMP (60 g/L, 0.2 M buffer, pH 7). The O phase was made of 20% w/v of PGPR dissolved in soy oil. The $W_2$ phase contained oligo-CGMP (60 g/L, 0.2 M buffer, pH 7). The mTG (2 U/mL) was added to the $W_1$ phase just before emulsification. The volume fraction of $W_1$ in O was 0.75 and the volume fraction of primary emulsion ($W_1$/O) in $W_2$ phase was 0.3. The double emulsion was diluted 100× in MQ-water for imaging in optical microscope as described in example 1.

Results and Conclusion

The test sample containing mTG resulted in the formation of a clear gel (FIG. 25). This indicates that oligomeric CGMP can be further cross-linked (polymerized) using mTG to form a clear (transparent/translucent) gel at around neutral pH and room temperature ('cold' gelation). This gel appears similar to the fine-stranded protein gels (e.g. gels obtained from gelatin or whey protein heated far away from their pI at low ionic strengths) indicating that gelation is caused by inter-fibril cross-linking and entanglement of fine strands (fibrils) of poly-CGMP. The transparency also indicates the absence of dense protein particles under these solution conditions. The dense protein particles typically lead to 'particulate' gels that appear turbid (opaque). Most importantly, the transition from a viscous solution to a gel can be precisely controlled in our case. To obtain a transparent gel from gelatin requires heating the solution and cooling it down to form a gel (also known as heat-set gel). In contrast, oligomeric CGMP was used as a starting ingredient to form a 'cold' gel (cold-set gel) i.e. at room temperature and without the need of a heating step. The 60 g/L solution is very viscous and forms a gel within 24 hours of adding 2 U/mL of mTG at 25° C. (FIG. 25). The kinetics of gelation can be controlled by varying the oligo-CGMP molar mass (degree of polymerization, DP), oligo-CGMP concentration, ionic strength, temperature, pH and the enzyme dosage. The speed of gelation is related to the molar mass (i.e. DP) of the starting oligo-CGMP. Hence, a higher molar mass oligo-CGMP gels faster than the lower molar mass sample. Higher ionic strength, temperature (up to optimum enzyme temperature) and enzyme dosage lead to a faster gelation. Calcium ($Ca^{2+}$) ions as well as the insoluble CaP (or CaC) nano/micro-particles modified the properties of the gel. When low concentration of CaP nanoparticles are generated in-situ in the poly-CGMP gel, the gel displays opalescence and appears to have bluish tinge. The appearance changes to milky/whitish with increasing concentration of the CaP particles.

This gelation mechanism was exploited to encapsulate (immobilize/entrap) bacteria in gel beads made of cross-linked oligo-CGMP as shown in FIG. 26. In general, the stability of the double emulsions with gelled $W_1$ phase was higher than without gelling. The formulation can be varied to achieve various drop sizes (1-100 μm), volume fractions (0.01-0.95 for primary emulsion and 0.001-0.75 for the secondary emulsion), emulsifier concentration (0.25-5% w/v in double emulsion) and stability (hours to months) and encapsulation efficiency (up to around 90%). After gelation of the inner water droplets the beads containing encapsulated bacteria can be separated by mild centrifugation or filtration or by de-emulsification using heat or dilutions or by adding a de-emulsifier. These microorganism containing beads can easily be further coated with appropriate coating e.g. a layer by layer coating of oppositely charged polyelectrolytes (proteins or polysaccharides). The oil phase can be changed to any food grade oil or fat (e.g. milk fats, fatty acids, lipids etc.) and food grad emulsifier. The microcapsules can be spray dried or freeze dried to obtain dry encapsulated bacteria. In conclusion, the cold gelation properties of oligo-CGMP (poly-CGMP) can be used for delivering textural and encapsulation functionalities in the food (dairy) products as well as in other bio-related applications.

Example 8—"Hierarchically-Assembled Structures"

Method

As explained in example 2, oligo-CGMP self-assembles into casein like association colloid when the solution concentration is changed from very dilute to dilute. The phase behavior of oligo-CGMP at very high concentrations (>>120 g/L) e.g. when the oligo-CGMP solution or gel (as obtained in example 7) is dried, was also investigated experimentally. Around 50 µL drop of the 60 g/L oligo-CGMP solution or gel (as described in example 7) was placed on a glass slide and covered with a thin glass cover slip. The sample was viewed under the transmittance mode in an optical microscope (BX 53, Olympus) and 40× magnification (UPlan FL N, 40×/0.75 Ph2). The images were captured using a CCD camera (SC 50, Olympus) attached to the microscope. The image was captured using software supplied by Olympus (cellSens Entry, exposure: 5.027 ms in normal mode and 50.09 ms in cross-polarized mode). HQ color images with standard aspect ratio and a resolution of 2560×1920 were captured and labelled with a precalibrated scale (white bar=10 µm). For monitoring the birefringence, polarizer (U-POT, Olympus, Japan) and analyzer (U-ANT, Olympus, Japan) were crossed at an angle of 900 with the sample kept in between them. The normal and cross-polarized images were recorded as a function of the drying time of the samples at temperature around 25° C. The drying proceeded from the side of the glass cover slip which was not sealed i.e. it was kept open for controlled drying as a function of time (0-72 h).

Results and Conclusion

Oligo-CGMP gel (as obtained in example 7) resembled the fine-stranded protein gels and was transparent. These fine strands (fibrils) in the gel are randomly oriented and hence the gel appears as 'black' (dark) with no birefringence in the cross-polarized microscopic images (FIG. 27a, left). It has been reported in the literature that hierarchical-assembly of protein fibers can lead to formation of nematic liquid crystalline phases due to ordered orientation. This was tested in the case of oligomeric CGMP by drying the solution and gel while monitoring it under cross-polarized light. At the start solution appears to be isotropic but during the course of drying, few birefringent spots start to appear close to the open edge of the cover slip. The birefringent material appeared elongated (FIG. 27a). The elongated birefringent material increased in their number and they were seen with many branching after extended drying. Eventually, birefringence appears throughout the sample. In some instances, a strongly birefringent fiber (bundles of fibrils) with some twists and turns was also seen (FIG. 27b). This phenomenon was not observed with monomeric CGMP and hence is related to polymerization of CGMP. This development of birefringence in oligo-CGMP solution/gel during drying is most probably originating from ordering (hierarchical assembly) of the fine strands (fibrils) leading to formation of a liquid crystalline phase. These hierarchically assembled fine strands are expected to be very useful for practical applications requiring protein based fibers, enhanced colloidal stabilization and mesoscale structure manipulation e.g. modification of rheology (texture) of a fermented or fresh dairy product. As well as for applications such as enhanced emulsion stabilization leading to very stable and effective microencapsulation as well as for controlled release or delivery of the encapsulated material.

In conclusion, the hierarchical-assembly described in this example along with that described in examples 2-7 can be combined in various (complex) ways to have varying amounts of organic (e.g. poly-CGMP) and inorganic (e.g. CaP/CaC) phases leading to diverse applications such as colloidal stabilization, texturing and encapsulation. These enhanced (modified) functionalities are governed by interactions at hierarchical length (time) scales. At molecular scale, the interactions between serine bound phosphate groups and inorganic calcium based particle surface (e.g. CaP/CaC) leads to binding of oligo-CGMP on the inorganic phase. At mesoscale, this interaction leads to creation of varying types of hierarchical structures. For example, the interactions between serine bound phosphate groups and inorganic CaP or CaC surface along with net charge resulting from balance between sialic acid, carboxylic acid and amine groups can modify the crystal size, type and degree of amorphousness. This in turn leads to increased surface area and hence enhanced capacity for immobilization and encapsulation. The interactions at molecular and mesoscale are eventually contributing to the functionality at macroscale (e.g. in a dairy product) such as texture and stability. The polymerization of CGMP to form oligo-CGMP (poly-CGMP) can hence be used for delivering novel functionalities (such as those described in FIG. 21) in diverse food (bio) applications and dairy based products.

REFERENCES

1: Yoav D. Uvney (Current Opinion in Colloid & Interface Science 15 (2010) 73-83)
2: M. H. Abd El-Salam, 2006. Separation of Casein Glycomacropeptide from Whey: Methods of Potential Industrial Application. International Journal of Dairy Science, 1: 93-99.
3: Jianquan Luo et al. Journal of Membrane Science 469 (2014) 127-139.
4: WO2008/017499A1
5: A. Tolkach et al. (Journal of Food Engineering 67 (2005) 13-20))

The invention claimed is:

1. A method for making a food, feed or pharmaceutical product, comprising:
adding a composition comprising cross-linked, via intermolecular covalent isopeptide bonds, casein glycomacropeptide (CGMP) oligomers (CGMP oligomers) to a food, feed or pharmaceutical product, wherein the CGMP oligomers are comprised of CGMP monomers comprising amino acid residues 106-169 of κ-casein, and wherein the product comprises, after addition of the composition, at least 1 mg of CGMP oligomers per kg of the product.

2. The method of claim 1, wherein the product is a food product and wherein the food product is a dairy product.

3. The method of claim 2, wherein the dairy product is yogurt, quark, cheese, pizza cheese, drinking yoghurt, cheese spreads, skyr or soured whole milk.

4. The method of claim 1, wherein the product comprises, after addition of the composition, at least 10 mg of CGMP oligomers per kg of the product.

5. The method of claim 1, wherein the composition comprising CGMP oligomers is obtained by a process comprising adding Transglutaminase (TGase) to a whey composition under conditions wherein monomeric CGMP of the whey composition are cross-linked, to thereby obtain CGMP oligomers.

6. The method of claim 1, wherein the composition comprising CGMP oligomers comprises at least 20% of CGMP oligomers (w/w of total protein content of the composition), comprises from 0.01 mg to 0.99 mg of CGMP oligomers per mg of the composition, and has a ratio of CGMP oligomers to para-κ-casein+κ-casein (w/w) higher than 2.

7. The method of claim 1, wherein the average degree of CGMP oligomer polymerization (DP) in the composition comprising CGMP oligomers is from 3 to 10000.

8. The method of claim 1, wherein the CGMP oligomers of the composition comprising CGMP oligomers are self-assembled (aggregated) CGMP oligomer particles.

9. The method of claim 8, wherein the self-assembled (aggregated) CGMP oligomer particles comprise encapsulated substances selected from a phytochemical, a color pigment, a water insoluble vitamin, a mineral, a peptide, or a fatty acid.

10. The method of claim 1, wherein the food, feed or pharmaceutical product is a beverage for human consumption with a pH below pH 5, and wherein the average degree of CGMP oligomer polymerization (DP) in the composition comprising CGMP oligomers is from 4 to 1000.

11. The method of claim 1, wherein the CGMP oligomers of the composition comprising CGMP oligomers are CGMP oligomer-Ca particles having a size from 10 nm to 1000 μm and wherein the average degree of CGMP oligomer polymerization (DP) in the composition comprising CGMP oligomers is from 3 to 100000.

12. The method of claim 11, wherein the CGMP oligomer-Ca particles are CGMP oligomer-CaP particles.

13. The method of claim 1, wherein the CGMP oligomers of the composition comprising CGMP oligomers are CGMP oligomer-Ca particles having a size from 10 nm to 1000 μm that comprise encapsulated molecules selected from color pigments, bacteriocin, enzymes, and bacteria, wherein the average degree of polymerization (DP) in the composition comprising CGMP oligomers is from 3 to 100000.

14. The method of claim 13, wherein the CGMP oligomer-Ca particles are CGMP oligomer-CaP particles.

15. The method of claim 5, wherein the whey composition is selected from whey, whey protein concentrate (WPC), whey protein isolate (WPI), and purified monomeric CGMP.

16. The method of claim 5, wherein the whey composition comprises at least 90% of whey proteins (w/w of total protein content of the sample).

* * * * *

UNITED STATES PATENT AND TRADEMARK OFFICE
CERTIFICATE OF CORRECTION

| | | |
|---|---|---|
| PATENT NO. | : 11,246,320 B2 | Page 1 of 1 |
| APPLICATION NO. | : 16/479144 | |
| DATED | : February 15, 2022 | |
| INVENTOR(S) | : Dhayal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 132 days.

Signed and Sealed this
Eleventh Day of February, 2025

Coke Morgan Stewart
*Acting Director of the United States Patent and Trademark Office*